US011014455B2

(12) United States Patent
Suyama et al.

(10) Patent No.: US 11,014,455 B2
(45) Date of Patent: May 25, 2021

(54) VEHICLE DRIVE DEVICE

(71) Applicant: AISIN AW CO., LTD., Anjo (JP)

(72) Inventors: Daiki Suyama, Okazaki (JP); Hiroaki Sanji, Takahama (JP); Mitsuhiro Ichioka, Nishio (JP); Yuki Kawaguchi, Gamagori (JP); Koji Ota, Anjo (JP); Kazuyuki Sasaki, Okazaki (JP); Isao Fujishima, Anjo (JP)

(73) Assignee: AISIN AW CO., LTD., Anjo (JP)

( * ) Notice: Subject to any disclaimer, the term of this patent is extended or adjusted under 35 U.S.C. 154(b) by 16 days.

(21) Appl. No.: 16/623,111

(22) PCT Filed: Aug. 24, 2018

(86) PCT No.: PCT/JP2018/031422
§ 371 (c)(1),
(2) Date: Dec. 16, 2019

(87) PCT Pub. No.: WO2019/039599
PCT Pub. Date: Feb. 28, 2019

(65) Prior Publication Data
US 2020/0215920 A1 Jul. 9, 2020

(30) Foreign Application Priority Data

Aug. 25, 2017 (JP) .............................. JP2017-162183
Mar. 6, 2018 (JP) .............................. JP2018-039785

(51) Int. Cl.
*B60L 15/00* (2006.01)
*H02K 7/116* (2006.01)
(Continued)

(52) U.S. Cl.
CPC ............ *B60L 15/007* (2013.01); *H02K 7/116* (2013.01); *F16H 48/08* (2013.01); *F16H 57/037* (2013.01);
(Continued)

(58) Field of Classification Search
None
See application file for complete search history.

(56) References Cited

U.S. PATENT DOCUMENTS

2008/0058149 A1* 3/2008 Yang ..................... F16H 48/34
475/230
2015/0045170 A1 2/2015 Ohmura et al.

FOREIGN PATENT DOCUMENTS

CA 2956916 A1 8/2017
JP S55-105653 U 7/1980
(Continued)

OTHER PUBLICATIONS

Mar. 26, 2020 European Search Report issued in European Patent Application No. 18 84 8484.
(Continued)

*Primary Examiner* — Colby M Hansen
(74) *Attorney, Agent, or Firm* — Oliff PLC

(57) ABSTRACT

A vehicle drive device that includes a rotating electrical machine that serves as a drive power source for a first wheel and a second wheel; a differential gear device that distributes drive power from the rotating electrical machine to the first wheel and the second wheel; a reduction device that includes a planetary gear mechanism with a sun gear, a carrier, and a ring gear; and a case that accommodates the rotating electrical machine, the differential gear device, and the reduction device.

20 Claims, 7 Drawing Sheets

(51) Int. Cl.
 *F16H 48/08* (2006.01)
 *F16H 57/037* (2012.01)
 *F16H 48/42* (2012.01)

(52) U.S. Cl.
 CPC .. *F16H 2048/085* (2013.01); *F16H 2048/423* (2013.01)

(56) References Cited

FOREIGN PATENT DOCUMENTS

| | | |
|---|---|---|
| JP | 2001-330111 A | 11/2001 |
| JP | 2004-153895 A | 5/2004 |
| JP | 2014-177868 A | 9/2014 |
| JP | 2015-230052 A | 12/2015 |
| JP | 2016-95034 A | 5/2016 |

OTHER PUBLICATIONS

Oct. 23, 2018 International Search Report issued in International Patent Application No. PCT/JP2018/031422.

\* cited by examiner

VEHICLE DRIVE DEVICE

BACKGROUND

The present disclosure relates to a vehicle drive device including a rotating electrical machine serving as a drive power source for two wheels, a differential gear device that distributes drive power from the rotating electrical machine to the two wheels, and a reduction device.

A power transmission device for an electric car (10) disclosed in the following JP 2001-330111 A includes a motor (12) serving as a drive power source for wheels; two rotating shafts (20, 21) that are drive-coupled to two wheels, respectively; a differential mechanism part (19) that distributes drive power from the motor (12) to the rotating shafts (20, 21); a reduction mechanism part (18); and a case (11) that accommodates those components. The reduction mechanism part (18) includes a first-train ring gear (23) and a second-train ring gear (28), and the ring gears (23, 28) are directly supported by the case (11). Note that the reference signs shown in parentheses in description of BACKGROUND are those in JP 2001-330111 A.

However, in the power transmission device for an electric car (10) of JP 2001-330111 A, since the first-train ring gear (23) and the second-train ring gear (28) are directly supported by the case (11), vibration occurring due to meshing of the first-train ring gear (23) with a first-train pinion (24) and meshing of the second-train ring gear (28) with a second-train pinion (29) is directly transmitted to the case (11). As a result, there is a problem that large gear noise may be generated.

SUMMARY

An exemplary aspect of the disclosure provides a vehicle drive device capable of reducing gear noise to a small level.

A vehicle drive device according to an exemplary aspect includes a rotating electrical machine that serves as a drive power source for a first wheel and a second wheel; a differential gear device that distributes drive power from the rotating electrical machine to the first wheel and the second wheel; a reduction device that includes a planetary gear mechanism with a sun gear, a carrier, and a ring gear; and a case that accommodates the rotating electrical machine, the differential gear device, and the reduction device, wherein: the differential gear device and the reduction device are disposed coaxially with the rotating electrical machine, the reduction device is disposed between the rotating electrical machine and the differential gear device in an axial direction, a support disposed inside the case is supported by the case, the ring gear is unrotatably supported by the support, the case and the support are in plane contact with each other, and a contact surface between the case and the support lies in a direction orthogonal to the axial direction.

According to this characteristic configuration, the support disposed inside the case is supported by the case, and the ring gear is unrotatably supported by the support. That is, the ring gear is supported by the case through the support which is a different member than the case and the ring gear. Hence, vibration occurring in a meshing portion between a pinion gear supported by the carrier and the ring gear is attenuated at a point between the ring gear and the support, the support, and a point between the support and the case, before transmitted to the case. Particularly, between the ring gear and the support and between the support and the case, the vibration can be attenuated by friction occurring by contact between the members.

In addition, according to this configuration, the case and the support are in contact with each other at the contact surface lying in the direction orthogonal to the axial direction. Hence, circumferential vibration occurring in the ring gear is transmitted to the contact surface between the case and the support, and is attenuated by circumferential friction occurring in the contact surface.

As described above, according to this configuration, vibration transmitted from the reduction device to the case can be reduced to a small level, and as a result, gear noise transmitted from the case to the outside can also be reduced to a small level.

DETAILED DESCRIPTION OF EMBODIMENTS

1. First Embodiment

Figure 1:
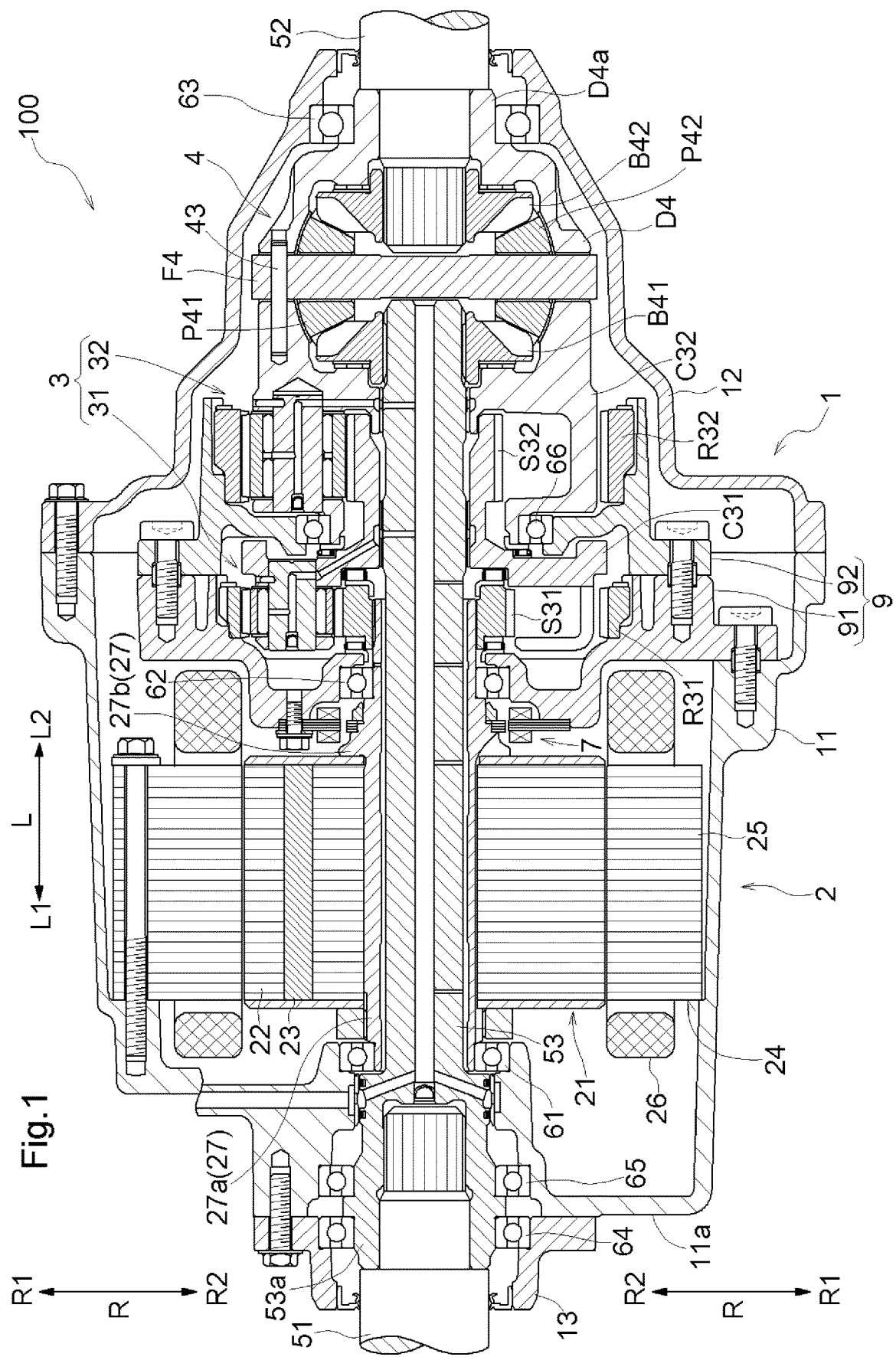
FIG. 1 is an axial cross-sectional view of a vehicle drive device according to a first embodiment.
Figure 2:
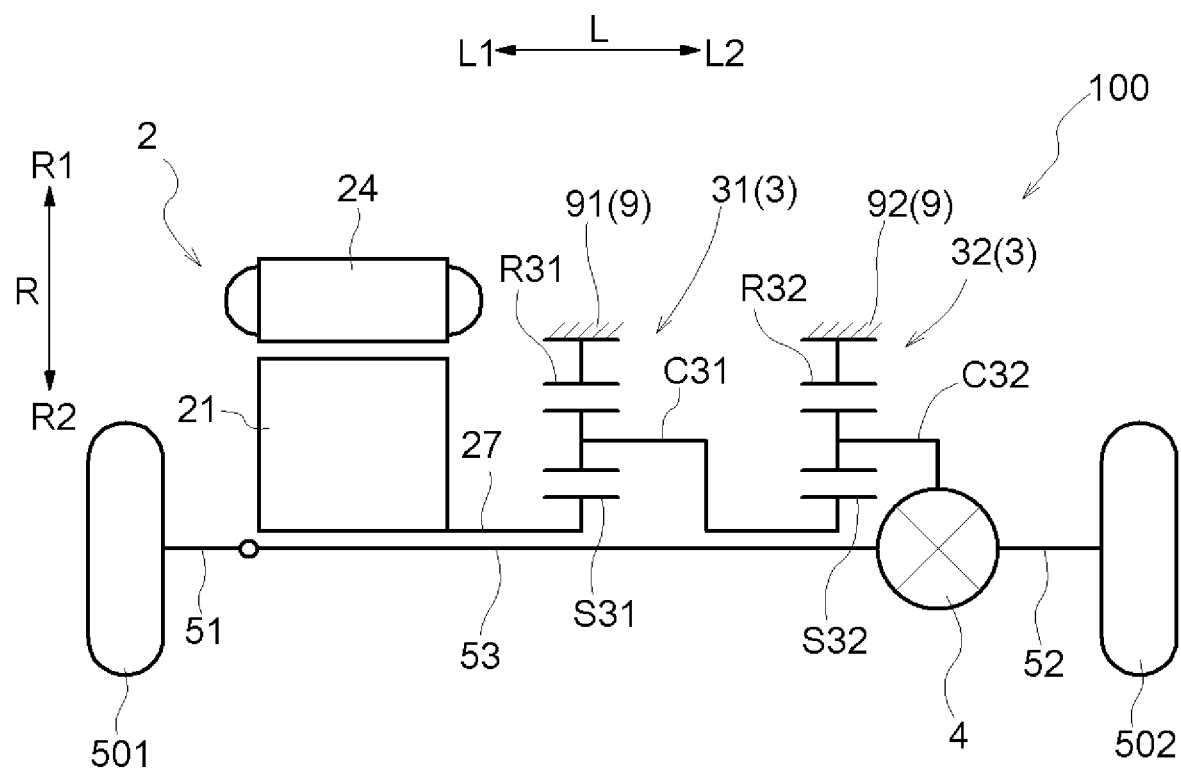
FIG. 2 is a skeleton diagram of the vehicle drive device according to the first embodiment.

The following describes a vehicle drive device 100 which is a first embodiment of a vehicle drive device, based on the drawings. FIG. 1 is an axial cross-sectional view of the vehicle drive device 100, and FIG. 2 is a skeleton diagram of the vehicle drive device 100. The vehicle drive device 100 is, for example, a drive device mounted on a hybrid car that uses an internal combustion engine and a rotating electrical machine as drive power sources for a first wheel 501 and a second wheel 502, or an electric car that uses a rotating electrical machine as a drive power source for the first wheel 501 and the second wheel 502. As shown in FIGS. 1 and 2, the vehicle drive device 100 includes only a rotating electrical machine 2 as a drive power source for the first wheel 501 and the second wheel 502. In the case of a four-wheel vehicle with two-wheel drive, an electric car can be implemented by the vehicle drive device 100. In addition, in the case of a four-wheel vehicle with four-wheel drive, a hybrid vehicle can be implemented by driving other two wheels by drive power of an internal combustion engine. As a matter of course, in the case of a four-wheel vehicle with four-wheel drive, a four-wheel drive electric car can also be implemented by applying the vehicle drive device 100 of the present embodiment to other two wheels, too.

In the following description, the term "drive-coupled" refers to a state in which two rotating elements are coupled to each other such that drive power can be transmitted, and includes a state in which the two rotating elements are coupled to each other such that they rotate together, or a state in which the two rotating elements are coupled to each other through one or two or more power transmission members such that drive power can be transmitted. Such power transmission members include various types of members that transmit rotation at the same speed or at a changed speed, e.g., shafts, gear mechanisms, belts, and chains. Note that the power transmission members may include engagement devices that selectively transmit rotation and drive power, e.g., friction engagement devices and mesh engagement devices. Note, however, that when the term "drive-coupled" is used for each rotating element of a reduction device 3 and a differential gear device 4 which will be described in the following description, the term "drive-coupled" refers to a state in which three or more rotating elements included in the reduction device 3 or the differential gear device 4 are drive-coupled to each other without through any other rotating element.

In addition, in the following description, when the term "coupled" is simply used, it refers to a state in which two members are separably coupled to each other and friction can occur by contact between the two members, and includes, for example, bolt fastening, spline fitting, and press fitting (it does not matter whether there are a key and a key groove). Note, however, that the term "coupling" does not include molecular coupling (e.g., welding) of two members.

The vehicle drive device 100 includes a case 1; the rotating electrical machine 2 having a rotor shaft 27 for outputting drive power; the reduction device 3 including planetary gear mechanisms; and the differential gear device 4 that distributes drive power from the rotating electrical machine 2 to each of a first drive shaft 51 and a second drive shaft 52 which are coupled to an intermediate shaft 53.

In the vehicle drive device 100, the rotating electrical machine 2, the reduction device 3, the differential gear device 4, the first drive shaft 51, the second drive shaft 52, and the intermediate shaft 53 are coaxially disposed relative to the rotor shaft 27 of the rotating electrical machine 2. Therefore, an axial direction of the rotor shaft 27 of the rotating electrical machine 2 is equivalent to an axial direction of a rotating shaft of the vehicle drive device 100, and a radial direction of the rotor shaft 27 of the rotating electrical machine 2 is equivalent to a radial direction of the vehicle drive device 100. Therefore, the axial direction of the rotor shaft 27 of the rotating electrical machine 2 is referred to as an axial direction L of the vehicle drive device 100, and the radial direction of the rotor shaft 27 of the rotating electrical machine 2 is referred to as a radial direction R of the vehicle drive device 100. In addition, a side of the axial direction L where the first drive shaft 51 is disposed is referred to as a first axial side L1, and a side of the axial direction L where the second drive shaft 52 is disposed is referred to as a second axial side L2. In addition, an outer side of the radial direction R which is opposite to the rotor shaft 27 is referred to as a radial outer side R1, and an inner side of the radial direction R which is on a rotor shaft 27 side is referred to as a radial inner side R2.

The case 1 accommodates therein the rotating electrical machine 2, the reduction device 3, the differential gear device 4, a part of the first drive shaft 51 (an end portion on the second axial side L2), a part of the second drive shaft 52 (an end portion on the first axial side L1), and the intermediate shaft 53. The case 1 includes a bottomed cylindrical case main body 11; a cylindrical main body cover 12 that is disposed so as to cover an opening portion of the case main body 11 on the opposite side (the second axial side L2) of a bottom part 11*a* which is located at an end portion of the case main body 11 on the first axial side L1; and a bottom part cover 13 that is disposed so as to cover the bottom part 11*a* on the first axial side L1 of the bottom part 11*a* of the case main body 11. The case main body 11 and the main body cover 12 are fixed together with a fixing member (a bolt in the present embodiment). The case main body 11 and the bottom part cover 13 are fixed together with a fixing member (a bolt in the present embodiment).

The rotating electrical machine 2 and a part of the reduction device 3 (a first planetary gear mechanism 31 which will be described later) are disposed in an inner space of the case main body 11. The other part of the reduction device 3 (a second planetary gear mechanism 32 which will be described later), the differential gear device 4, and a part of the second drive shaft 52 (an end portion on the first axial side L1) are disposed in an inner space of the main body cover 12. A part of the first drive shaft 51 (an end portion on the second axial side L2) is disposed in an inner space formed by the case main body 11 and the bottom part cover 13. The intermediate shaft 53 is disposed in an inner space formed by the case main body 11, the main body cover 12, and the bottom part cover 13. In the case 1, a portion of the case main body 11 excluding the bottom part 11*a* and the main body cover 12 correspond to a "surrounding wall part". That is, the case 1 includes the cylindrical "surrounding wall part" that encloses the radial outer sides R1 of the rotating electrical machine 2, the reduction device 3, and the differential gear device 4.

The rotating electrical machine 2 is, as described above, a drive power source for the first wheel 501 and the second wheel 502. The rotating electrical machine 2 is a permanent-magnet rotating electrical machine including a rotor 21 including a permanent magnet 23 inside a rotor core 22; a stator 24 having a stator coil 26 wound around a stator core 25; and the rotor shaft 27 fixed to the rotor core 22. On the radial inner side R2 of the rotor core 22, the rotor shaft 27 is fixed to the rotor core 22, and the rotor 21 and the rotor shaft 27 rotate together. Note that although in the present embodiment the rotating electrical machine 2 is a permanent-magnet rotating electrical machine, the rotating electrical machine 2 may be a rotating electrical machine of other modes, e.g., an induction rotating electrical machine.

The rotor shaft 27 is a shaft member formed in a cylindrical shape. Here, the terms "cylindrical shape" and "cylindrical" refer to that even if a member has some odd-shaped portions, the overall schematic shape of the member is cylindrical (other expressions used with the term "shape" regarding a shape, etc., also hereinafter have the same meaning). The rotor shaft 27 includes a first supported part 27*a* protruding more on the first axial side L1 in the axial direction L than the rotor core 22; and a second supported part 27*b* protruding more on the second axial side L2 in the axial direction L than the rotor core 22. The first supported part 27*a* is rotatably supported by the case main body 11 of the case 1 through a first rotor bearing 61, and the second supported part 27*b* is rotatably supported by a first supporter 91 of a supporting member 9 (support) which will be described later through a second rotor bearing 62. The rotor shaft 27 functions as a "rotating member".

The reduction device 3 is disposed between the rotating electrical machine 2 and the differential gear device 4 in the axial direction L, and reduces the speed of the rotation of the rotating electrical machine 2 and transmits drive power to the differential gear device 4. In the present embodiment, the reduction device 3 includes the first planetary gear mechanism 31 and the second planetary gear mechanism 32.

The first planetary gear mechanism 31 includes a first sun gear S31, a first ring gear R31, and a first carrier C31. The first sun gear S31 is an input element of the first planetary gear mechanism 31, and is fixed to the rotor shaft 27 of the rotating electrical machine 2. The first ring gear R31 is supported by the first supporter 91 of the supporting member 9 which will be described later, so as to be unrotatable in a circumferential direction. The first carrier C31 is an output element of the first planetary gear mechanism 31, and is rotatably supported by the intermediate shaft 53 through a bearing such as a bushing.

The second planetary gear mechanism 32 is adjacent in the axial direction L to the first planetary gear mechanism 31, and is disposed on the opposite side of the first planetary gear mechanism 31 from a rotating electrical machine 2 side. That is, the rotating electrical machine 2, the first planetary gear mechanism 31, and the second planetary gear mechanism 32 are disposed side by side in the order of description in the axial direction L and from the first axial side L1 to the second axial side L2. The second planetary gear mechanism 32 includes a second sun gear S32, a second ring gear R32, and a second carrier C32. The second sun gear S32 is an input element of the second planetary gear mechanism 32, and is fixed to the first carrier C31 of the first planetary gear mechanism 31. In the present embodiment, the second sun gear S32 is integrally formed with the first carrier C31. The second ring gear R32 is supported by a second supporter 92 of the supporting member 9 which will be described later, so as to be unrotatable in a circumferential direction. The second carrier C32 is an output element of the second planetary gear mechanism 32, and is rotatably supported by the intermediate shaft 53 through a bearing such as a bushing. The second carrier C32 functions as a "rotating member".

The differential gear device 4 is disposed between the reduction device 3 and the second drive shaft 52 in the axial direction L. The differential gear device 4 outputs drive power which is transmitted from the rotating electrical machine 2 through the reduction device 3, to the first drive shaft 51 and the second drive shaft 52 which are coupled to the intermediate shaft 53, in a distributed manner. The differential gear device 4 includes a differential case D4 serving as an input element; a differential pinion shaft F4 fixed to the differential case D4; a first differential pinion gear P41 and a second differential pinion gear P42 which are rotatably supported on the differential pinion shaft F4; and a first side gear B41 and a second side gear B42 which serve as distribution output elements. Here, the first differential pinion gear P41, the second differential pinion gear P42, the first side gear B41, and the second side gear B42 are all bevel gears.

The differential case D4 is a hollow member, and is configured to be able to accommodate therein the differential pinion shaft F4, the first differential pinion gear P41 and the second differential pinion gear P42, and the first side gear B41 and the second side gear B42. The differential case D4 is integrated with the second carrier C32 which is the output element of the second planetary gear mechanism 32 of the reduction device 3. In the present embodiment, the differential case D4 is integrally formed with the second carrier C32. The differential case D4 includes a supported part D4a protruding more on the second axial side L2 in the axial direction L than the second side gear B42. The supported part D4a is formed in a cylindrical shape with a common axis to the first side gear B41 and the second side gear B42. The supported part D4a is rotatably supported by the main body cover 12 of the case 1 through a differential bearing 63.

The differential pinion shaft F4 is inserted through the first differential pinion gear P41 and the second differential pinion gear P42, and rotatably supports the first differential pinion gear P41 and the second differential pinion gear P42. The differential pinion shaft F4 is inserted into a through-hole made in the differential case D4 in the radial direction R, and is fixed to the differential case D4 with a fixing member 43.

The first differential pinion gear P41 and the second differential pinion gear P42 are mounted on the differential pinion shaft F4 such that they face each other in the radial direction R with a predetermined spacing therebetween, and are configured to rotate around the differential pinion shaft F4 in an inner space of the differential case D4.

The first side gear B41 and the second side gear B42 are post-distribution rotating elements of the differential gear device 4. The first side gear B41 and the second side gear B42 are provided so as to face each other in the axial direction L with the differential pinion shaft F4 sandwiched therebetween and with a predetermined spacing therebetween, and are configured to rotate in their respective circumferential directions in the inner space of the differential case D4. The first side gear B41 and the second side gear B42 mesh with the first differential pinion gear P41 and the second differential pinion gear P42. Splines for coupling the intermediate shaft 53 are formed on the entire circumferential inner surface of the first side gear B41. Splines for coupling the second drive shaft 52 are formed on the entire circumferential inner surface of the second side gear B42.

The intermediate shaft 53 is a shaft member that transmits drive power from the rotating electrical machine 2 which is distributed by the differential gear device 4, to the first drive shaft 51. The intermediate shaft 53 passes through the radial inner side of the rotor shaft 27 of the rotating electrical machine 2 in the axial direction L. Splines for coupling the first side gear B41 of the differential gear device 4 are formed on the entire circumferential outer surface of an end portion of the intermediate shaft 53 on the second axial side L2. By the splines engaging with the splines on the inner surface of the first side gear B41, the intermediate shaft 53 and the first side gear B41 are coupled to each other so as to rotate together. A coupling part 53a for coupling the first drive shaft 51 is formed at an end portion of the intermediate shaft 53 on the first axial side L1.

The coupling part 53a extends over an area from a portion of the inner space of the case main body 11 more on the first axial side L1 than the rotating electrical machine 2 to an inner space of the bottom part cover 13. The coupling part 53a is formed in a cylindrical shape with a common axis to a portion of the intermediate shaft 53 other than the coupling part 53a. The coupling part 53a has a larger outside diameter than the outside diameter of the portion of the intermediate shaft 53 other than the coupling part 53a. The coupling part 53a is rotatably supported by the bottom part cover 13 of the case 1 through a first output bearing 64, and is rotatably supported by the bottom part 11a of the case main body 11 through a second output bearing 65. Splines for coupling the first drive shaft 51 are formed on the entire circumferential inner surface of a portion of the coupling part 53a on the second axial side L2.

The first drive shaft 51 is drive-coupled to the first wheel 501 and functions as a "first output member". The second drive shaft 52 is drive-coupled to the second wheel 502 and functions as a "second output member". Note that in the present embodiment the coupling part 53a is provided at the end portion of the intermediate shaft 53 on the first axial side L1, and the first drive shaft 51 and the coupling part 53a of the intermediate shaft 53 are coupled to each other with the splines. However, the configuration is not limited thereto and may be such that, for example, instead of the coupling part 53a, a flange yoke is provided at the end portion of the intermediate shaft 53 on the first axial side L1, and the flange yoke and the first drive shaft 51 are fastened with a bolt.

In the present embodiment, the vehicle drive device 100 further includes the supporting member 9. A configuration of the supporting member 9 will be described in detail below with reference to FIG. 3.

Figure 3:
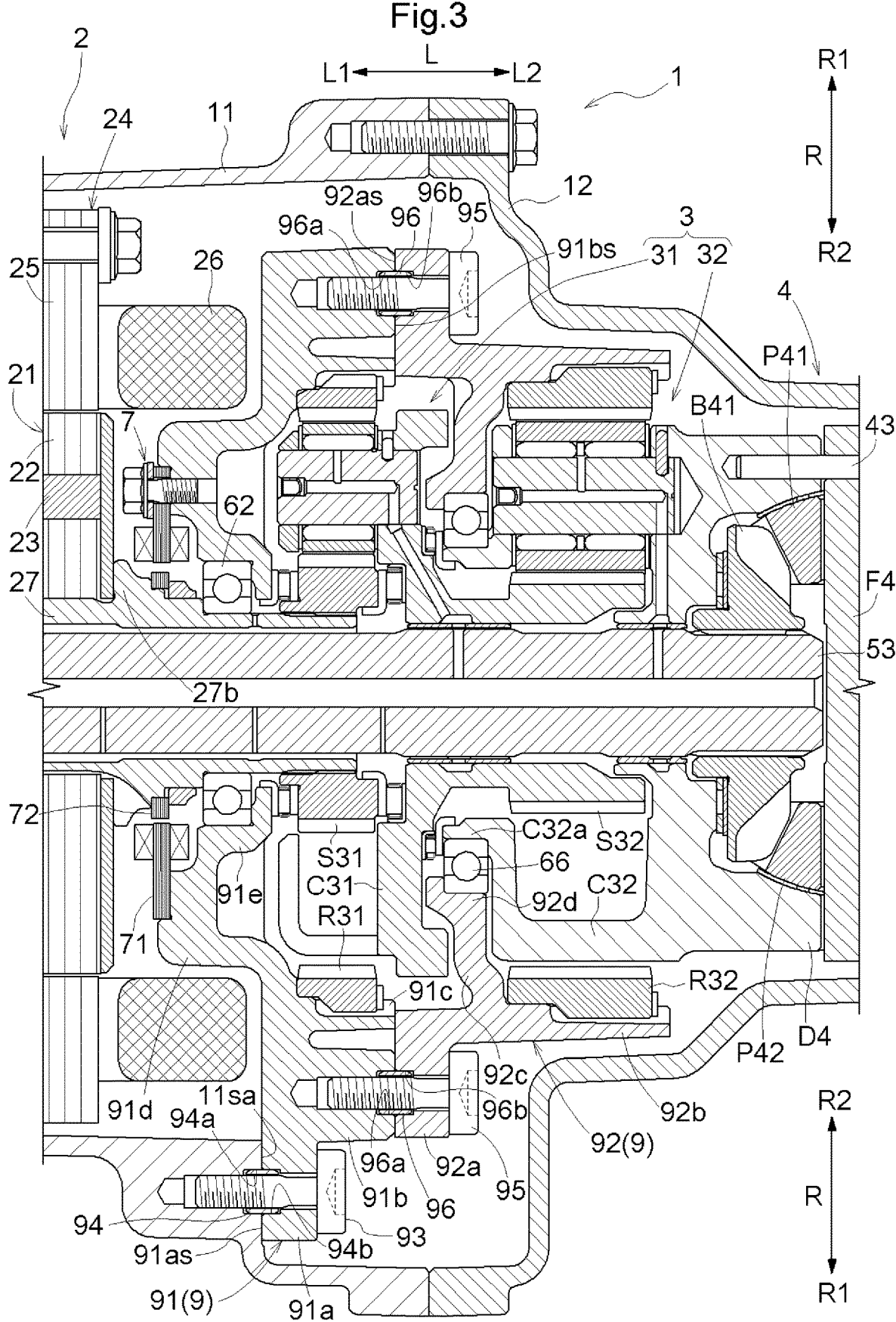
FIG. 3 is an axial cross-sectional view of a main part of the vehicle drive device according to the first embodiment.

As shown in FIG. 3, the supporting member 9 is provided inside the case 1, and is disposed between the rotating electrical machine 2 and the differential gear device 4 in the axial direction L. The supporting member 9 is not integrally formed with members that form the case 1 and the reduction device 3 of the vehicle drive device 100, but is formed as a different member than those members. The supporting member 9 includes the first supporter 91 and the second supporter 92.

The first supporter 91 includes a case coupling part 91a, a first connecting part 91b, a first gear supporting part 91c (second support), a first protruding wall part 91d (protruding wall), and a shaft supporting part 91e.

The case coupling part 91a is coupled to the case main body 11 of the case 1. The case coupling part 91a is supported by the case 1, being in plane contact with the case main body 11 of the case 1. A contact surface between the case coupling part 91a and the case main body 11 lies in a direction orthogonal to the axial direction L. Specifically, a coupling-part contact surface 91as extending in the direction orthogonal to the axial direction L is formed at a portion of the case coupling part 91a facing the case main body 11, and a first case contact surface 11sa extending in the direction orthogonal to the axial direction L is formed at a portion of the case main body 11 facing the case coupling part 91a. The coupling-part contact surface 91as of the case coupling part 91a and the first case contact surface 11sa of the case main body 11 are in contact with each other. Here, the "direction orthogonal to the axial direction L" is the radial direction R and the circumferential direction.

In the present embodiment, the case coupling part 91a is coupled to the case main body 11 with a first bolt 93. The first bolt 93 is screwed into the case main body 11, with the first bolt 93 passing through the case coupling part 91a in the axial direction L. The first bolt 93 is disposed so as to pass through a cylindrical first pin 94. The first pin 94 is used for positioning upon coupling the case coupling part 91a to the case main body 11.

The first pin 94 is formed so as to extend in the axial direction L from a boundary portion between the case coupling part 91a and the case main body 11, with the case coupling part 91a coupled to the case main body 11 with the first bolt 93. A first press-fitting groove 94a into which the first pin 94 is press-fit is formed in a bolt-hole of the case main body 11, and a first insertion groove 94b into which the first pin 94 is inserted is formed in a bolt-hole of the case coupling part 91a. The first press-fitting groove 94a is formed in the axial direction L from the first case contact surface 11sa. The inside diameter of the first press-fitting groove 94a is the same as or smaller than the outside diameter of the first pin 94. The first insertion groove 94b is formed in the axial direction L from the coupling-part contact surface 91as. The inside diameter of the first insertion groove 94b is larger than the outside diameter of the first pin 94. Hence, in a state in which the first pin 94 is inserted into the first insertion groove 94b, circumferential vibration of the case coupling part 91a with respect to the case main body 11 is allowed. Thus, regardless of the presence of the first pin 94, circumferential vibration occurring in the first ring gear R31 supported by the first supporter 91 is attenuated by circumferential friction occurring between the first case contact surface 11sa and the coupling-part contact surface 91as.

In the present embodiment, the case coupling part 91a is formed at an end portion of the first supporter 91 on the radial outer side R1. The case coupling part 91a is formed at one or a plurality of locations in the circumferential direction of the first supporter 91.

The first connecting part 91b is coupled to the second supporter 92. In the present embodiment, the first connecting part 91b is formed more on the radial inner side R2 than the case coupling part 91a. The first connecting part 91b is continuously or intermittently formed in the circumferential direction.

The first gear supporting part 91c is coupled to the first ring gear R31 of the first planetary gear mechanism 31 of the reduction device 3, and supports the first ring gear R31 so as to disable rotation in the circumferential direction. Here, the first gear supporting part 91c is coupled to the first ring gear R31 from the radial outer side R1 by spline fitting. In the present embodiment, the first gear supporting part 91c is formed more on the radial inner side R2 than the first connecting part 91b. The first gear supporting part 91c is continuously formed over the entire circumferential surface of the first supporter 91.

The first protruding wall part 91d protrudes more on the radial inner side R2 than the first gear supporting part 91c, and is continuously formed in the circumferential direction. As such, the first protruding wall part 91d is formed in a flange shape. The first protruding wall part 91d is formed over an area from the first gear supporting part 91c to the shaft supporting part 91e between the rotating electrical machine 2 and the first planetary gear mechanism 31 of the reduction device 3.

In addition, in the present embodiment, a first detector 71 which is a component of a rotational position sensor 7 is provided on the first protruding wall part 91d. The rotational position sensor 7 is composed of a resolver including the first detector 71 and a second detector 72. The first detector 71 is disposed at a portion of the first protruding wall part 91d located on the first axial side L1 and located more on the radial inner side R2 than the stator coil 26 of the rotating electrical machine 2. The second detector 72 is provided on an outer surface of the second supported part 27b of the rotor shaft 27 of the rotating electrical machine 2, and is disposed so as to be aligned in the axial direction L with the first detector 71. For example, the rotational position sensor 7 detects a phase of an alternating-current voltage based on a relative angle of the second detector 72 to the first detector 71 which is obtained when an alternating current passes through a coil included in the first detector 71, and thereby detects a rotational position of the rotor shaft 27. The rotational position sensor 7 is not limited to a resolver and can be composed of various types of sensors, e.g., a Hall element sensor, an encoder, and a magnetic rotation sensor.

The shaft supporting part 91e rotatably supports the second supported part 27b of the rotor shaft 27 of the rotating electrical machine 2 through the second rotor bearing 62. In the present embodiment, the shaft supporting part 91e is formed at an end portion of the first supporter 91 on the radial inner side R2. The shaft supporting part 91e is continuously formed over the entire circumferential surface of the first supporter 91.

The second supporter 92 includes a second connecting part 92a, a second gear supporting part 92b, a second protruding wall part 92c, and a carrier supporting part 92d.

The second connecting part 92a is supported by the first supporter 91, being in plane contact with the first connecting part 91b of the first supporter 91. A contact surface between the second connecting part 92a and the first connecting part 91b lies in the direction orthogonal to the axial direction L. Specifically, a second-connecting-part contact surface 92as extending in the direction orthogonal to the axial direction L is formed at a portion of the second connecting part 92a facing the first connecting part 91b, and a first-connecting-part contact surface 91bs extending in the direction orthogonal to the axial direction L is formed at a portion of the first connecting part 91b facing the second connecting part 92a. The second-connecting-part contact surface 92as and the first-connecting-part contact surface 91bs are in contact with each other.

The second connecting part 92a is coupled to the first connecting part 91b of the first supporter 91. The second connecting part 92a is continuously or intermittently formed in the circumferential direction. In the present embodiment, the second connecting part 92a is coupled to the first connecting part 91b with second bolts 95 at one or a plurality of locations in the circumferential direction. Each second bolt 95 is screwed into the first connecting part 91b, with the second bolt 95 passing through the second connecting part 92a in the axial direction L. The second bolt 95 is disposed so as to pass through a cylindrical second pin 96. The second pin 96 is used for positioning upon coupling the second connecting part 92a to the first connecting part 91b.

Each second pin 96 is formed so as to extend in the axial direction L from a boundary portion between the first connecting part 91b and the second connecting part 92a, with the first connecting part 91b coupled to the second connecting part 92a with a corresponding second bolt 95. A second press-fitting groove 96a into which a corresponding second pin 96 is press-fit is formed in a bolt-hole of the first connecting part 91b, and a second insertion groove 96b into which the second pin 96 is inserted is formed in a bolt-hole of the second connecting part 92a. The second press-fitting groove 96a is formed in the axial direction L from the first-connecting-part contact surface 91bs. The inside diameter of the second press-fitting groove 96a is the same as or smaller than the outside diameter of the second pin 96. The second insertion groove 96b is formed in the axial direction L from the second-connecting-part contact surface 92as. The inside diameter of the second insertion groove 96b is larger than the outside diameter of the second pin 96. Hence, in a state in which the second pin 96 is inserted into the second insertion groove 96b, circumferential vibration of the second connecting part 92a with respect to the first connecting part 91b is allowed. Thus, regardless of the presence of the second pins 96, circumferential vibration occurring in the second ring gear R32 supported by the second supporter 92 is attenuated by circumferential friction occurring between the first-connecting-part contact surface 91bs and the second-connecting-part contact surface 92as.

The second gear supporting part 92b is coupled to the second ring gear R32 of the second planetary gear mechanism 32 of the reduction device 3, and supports the second ring gear R32 so as to disable rotation in the circumferential direction. Here, the second gear supporting part 92b is coupled to the second ring gear R32 from the radial outer side R1 by spline fitting. In the present embodiment, the second gear supporting part 92b is formed more on the radial inner side R2 and more on the second axial side L2 than the second connecting part 92a. The second gear supporting part 92b is continuously formed over the entire circumferential surface of the second supporter 92.

The second protruding wall part 92c protrudes more on the radial inner side R2 than the second gear supporting part 92b, and is continuously formed in the circumferential direction. As such, the first protruding wall part 91d is formed in a flange shape. The second protruding wall part 92c is formed over an area from the second gear supporting part 92b to the carrier supporting part 92d between the first planetary gear mechanism 31 and the second planetary gear mechanism 32 of the reduction device 3.

The carrier supporting part 92d rotatably supports the second carrier C32 of the second planetary gear mechanism 32 of the reduction device 3 through a carrier bearing 66 supported by the carrier supporting part 92d. Specifically, the second carrier C32 includes a supported part C32a protruding on the first axial side L1 between the first planetary gear mechanism 31 and the second planetary gear mechanism 32 of the reduction device 3, and the supported part C32a is rotatably supported by the carrier supporting part 92d through the carrier bearing 66. As described above, the second carrier C32 is integrated with the differential case D4. Hence, by the carrier supporting part 92d rotatably supporting the second carrier C32 through the carrier bearing 66, the carrier supporting part 92d also rotatably supports the differential case D4. That is, the carrier supporting part 92d rotatably supports the second carrier C32 and the differential case D4 through the carrier bearing 66. In the present embodiment, the carrier supporting part 92d is formed at an end portion of the second supporter 92 on the radial inner side R2. The carrier supporting part 92d is continuously formed over the entire circumferential surface of the second supporter 92.

As described above, the supporting member 9 according to the first embodiment includes the first supporter 91 and the second supporter 92. The first supporter 91 is coupled to the case main body 11 of the case 1 at the case coupling part 91a. As described above, since the term "coupling" does not include molecular coupling of two members, the first supporter 91 is a different member than the case 1. The first supporter 91 is coupled to the first ring gear R31 and unrotatably supports the first ring gear R31 at the first gear supporting part 91c. Likewise, since the term "coupling" does not include molecular coupling of two members, the first supporter 91 is a different member than the first ring gear R31. The first supporter 91 rotatably supports the rotor shaft 27 at the shaft supporting part 91e. Furthermore, the first supporter 91 includes the first protruding wall part 91d that protrudes more on the radial inner side R2 than the first gear supporting part 91c and that is continuously formed in the circumferential direction.

In addition, the second supporter 92 is coupled to the second ring gear R32 and unrotatably supports the second ring gear R32 at the second gear supporting part 92b. As described above, since the term "coupling" does not include molecular coupling of two members, the second supporter 92 is a different member than the second ring gear R32. The second supporter 92 rotatably supports the second carrier C32 at the carrier supporting part 92d. Furthermore, the second supporter 92 includes the second protruding wall part 92c that protrudes more on the radial inner side R2 than the second gear supporting part 92b and that is continuously formed in the circumferential direction.

In addition, the first supporter 91 and the second supporter 92 are coupled to each other at the first connecting part 91b and the second connecting part 92a. As described above, since the term "coupling" does not include molecular coupling of two members, the first supporter 91 is a different member than the second supporter 92.

2. Second Embodiment

Figure 4:
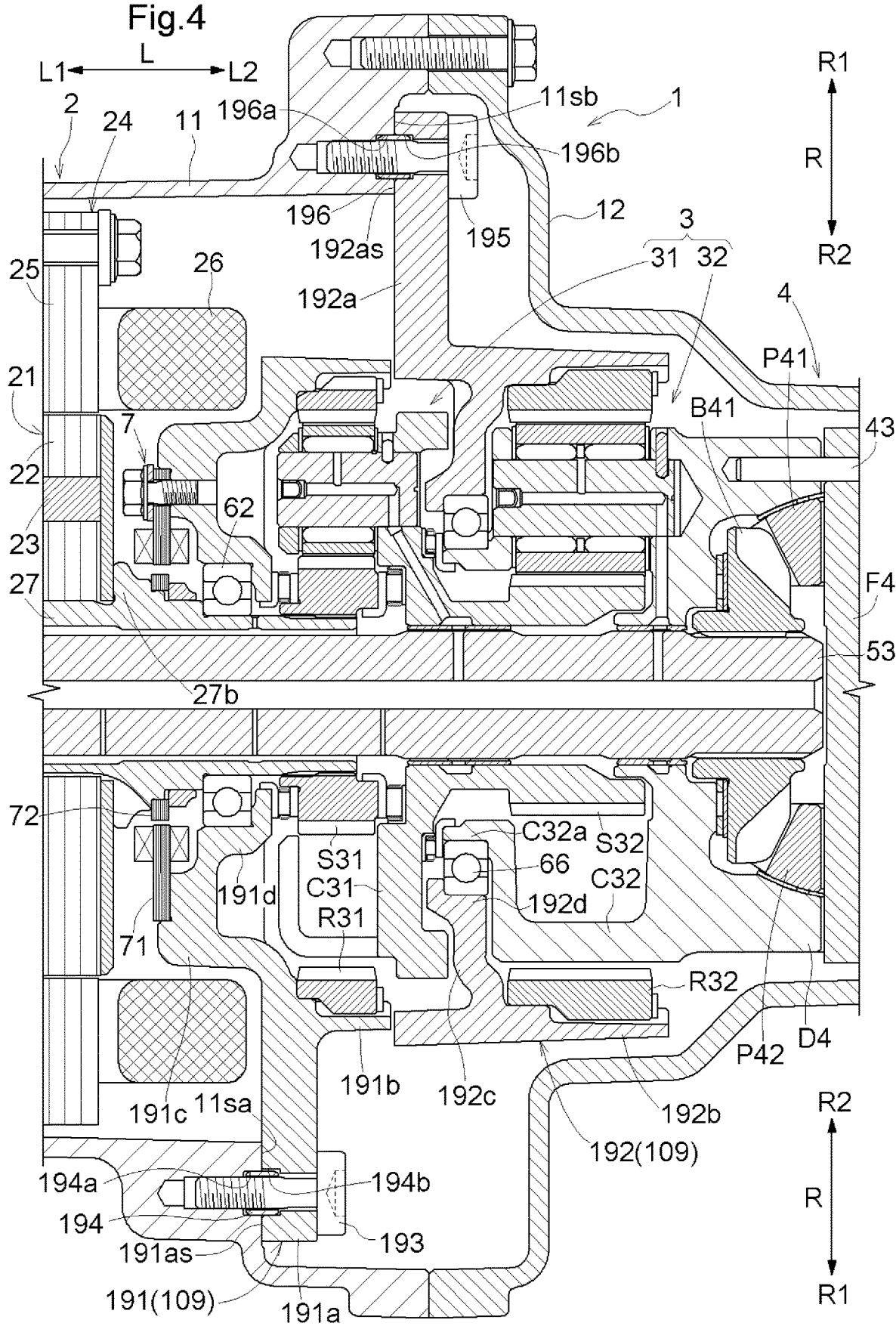
FIG. 4 is an axial cross-sectional view of a main part of a vehicle drive device according to a second embodiment.

The following describes a second embodiment of a vehicle drive device, using FIG. 4. In the present embodiment, a supporting member 109 different than the supporting member 9 of the first embodiment is provided. The following mainly describes differences from the above-described first embodiment. Note that points that are not particularly described are the same as those of the first embodiment.

As shown in FIG. 4, the supporting member 109 is provided inside the case 1, and is disposed between the rotating electrical machine 2 and the differential gear device 4 in the axial direction L. The supporting member 109 is not integrally formed with members that form the case 1 and the reduction device 3 of the vehicle drive device 100, but is formed as a different member than those members. The supporting member 109 includes a first supporter 191 and a second supporter 192.

The first supporter 191 includes a first case coupling part 191a, a first gear supporting part 191b, a first protruding wall part 191c, and a shaft supporting part 191d.

The first case coupling part 191a is coupled to the case main body 11 of the case 1. The first case coupling part 191a is supported by the case 1, being in plane contact with the case main body 11 of the case 1. A contact surface between the first case coupling part 191a and the case main body 11 lies in the direction orthogonal to the axial direction L. Specifically, a first coupling-part contact surface 191as extending in the direction orthogonal to the axial direction L is formed at a portion of the first case coupling part 191a facing the case main body 11, and the first coupling-part contact surface 191as of the first case coupling part 191a and the first case contact surface 11sa of the case main body 11 are in contact with each other.

In the present embodiment, the first case coupling part 191a is coupled to the case main body 11 with a first bolt 193. The first bolt 193 is screwed into the case main body 11, with the first bolt 193 passing through the first case coupling part 191a in the axial direction L. The first bolt 193 is disposed so as to pass through a cylindrical first pin 194. The first pin 194 is used for positioning upon coupling the first case coupling part 191a to the case main body 11.

The first pin 194 is formed so as to extend in the axial direction L from a boundary portion between the first case coupling part 191a and the case main body 11, with the first case coupling part 191a coupled to the case main body 11 with the first bolt 193. A first press-fitting groove 194a into which the first pin 194 is press-fit is formed in a bolt-hole of the case main body 11, and a first insertion groove 194b into which the first pin 194 is inserted is formed in a bolt-hole of the first case coupling part 191a. The first press-fitting groove 194a is formed in the axial direction L from the first case contact surface 11sa. The inside diameter of the first press-fitting groove 194a is the same as or smaller than the outside diameter of the first pin 194. The first insertion groove 194b is formed in the axial direction L from the first coupling-part contact surface 191as. The inside diameter of the first insertion groove 194b is larger than the outside diameter of the first pin 194. Hence, in a state in which the first pin 194 is inserted into the first insertion groove 194b, circumferential vibration of the first case coupling part 191a with respect to the case main body 11 is allowed. Thus, regardless of the presence of the first pin 194, circumferential vibration occurring in the first ring gear R31 supported by the first supporter 191 is attenuated by circumferential friction occurring between the first case contact surface 11sa and the first coupling-part contact surface 191as.

In the present embodiment, the first case coupling part 191a is formed at an end portion of the first supporter 191 on the radial outer side R1. The first case coupling part 191a is formed at one or a plurality of locations in the circumferential direction of the first supporter 191.

The first gear supporting part 191b is coupled to the first ring gear R31 of the first planetary gear mechanism 31 of the reduction device 3, and supports the first ring gear R31 so as to disable rotation in the circumferential direction. Here, the first gear supporting part 191b is coupled to the first ring gear R31 from the radial outer side R1 by spline fitting. In the present embodiment, the first gear supporting part 191b is formed more on the radial inner side R2 than the first case coupling part 191a. The first gear supporting part 191b is continuously formed over the entire circumferential surface of the first supporter 191.

The first protruding wall part 191c protrudes more on the radial inner side R2 than the first gear supporting part 191b, and is continuously formed in the circumferential direction. As such, the first protruding wall part 191c is formed in a flange shape. The first protruding wall part 191c is formed over an area from the first gear supporting part 191b to the shaft supporting part 191d between the rotating electrical machine 2 and the first planetary gear mechanism 31 of the reduction device 3. In addition, the first detector 71 of the rotational position sensor 7 is provided on the first protruding wall part 191c.

The shaft supporting part 191d rotatably supports the second supported part 27b of the rotor shaft 27 of the rotating electrical machine 2 through the second rotor bearing 62. In the present embodiment, the shaft supporting part 191d is formed at an end portion of the first supporter 191 on the radial inner side R2. The shaft supporting part 191d is continuously formed over the entire circumferential surface of the first supporter 191.

The second supporter 192 includes a second case coupling part 192a, a second gear supporting part 192b, a second protruding wall part 192c, and a carrier supporting part 192d.

The second case coupling part 192a is coupled to the case main body 11 of the case 1. The second case coupling part 192a is supported by the case 1, being in plane contact with the case main body 11 of the case 1. A contact surface between the second case coupling part 192a and the case main body 11 lies in the direction orthogonal to the axial direction L. Specifically, a second coupling-part contact surface 192as extending in the direction orthogonal to the axial direction L is formed at a portion of the second case coupling part 192a facing the case main body 11, and a second case contact surface 11sb extending in the direction orthogonal to the axial direction L is formed at a portion of the case main body 11 facing the second case coupling part 192a. The second coupling-part contact surface 192as of the second case coupling part 192a and the second case contact surface 11sb of the case main body 11 are in contact with each other.

In the present embodiment, the second case coupling part 192a is coupled to the case main body 11 with a second bolt 195. The second bolt 195 is screwed into the case main body 11, with the second bolt 195 passing through the second case coupling part 192a in the axial direction L. The second bolt 195 is disposed so as to pass through a cylindrical second pin 196. The second pin 196 is used for positioning upon coupling the second case coupling part 192a to the case main body 11.

The second pin 196 is formed so as to extend in the axial direction L from a boundary portion between the second case coupling part 192a and the case main body 11, with the second case coupling part 192a coupled to the case main body 11 with the second bolt 195. A second press-fitting groove 196a into which the second pin 196 is press-fit is formed in a bolt-hole of the case main body 11, and a second insertion groove 196b into which the second pin 196 is inserted is formed in a bolt-hole of the second case coupling part 192a. The second press-fitting groove 196a is formed in the axial direction L from the second case contact surface 11sb. The inside diameter of the second press-fitting groove 196a is the same as or smaller than the outside diameter of the second pin 196. The second insertion groove 196b is formed in the axial direction L from the second coupling-part contact surface 192as. The inside diameter of the second insertion groove 196b is larger than the outside diameter of the second pin 196. Hence, in a state in which the second pin 196 is inserted into the second insertion groove 196b, circumferential vibration of the second case coupling part 192a with respect to the case main body 11 is allowed. Thus, regardless of the presence of the second pin 196, circumferential vibration occurring in the second ring gear R32 supported by the second supporter 192 is attenuated by circumferential friction occurring between the second case contact surface 11sb and the second coupling-part contact surface 192as.

A location where the second case coupling part 192a of the second supporter 192 is coupled to the case main body 11 differs in the position in the axial direction L from a location where the first case coupling part 191a of the first supporter 191 is coupled to the case main body 11. In addition, the location where the second case coupling part 192a of the second supporter 192 is coupled to the case main body 11 differs also in the position in the circumferential direction from the location where the first case coupling part 191a of the first supporter 191 is coupled to the case main body 11. In the present embodiment, the second case coupling part 192a is formed at an end portion of the second supporter 192 on the radial outer side R1. The second case coupling part 192a is formed at one or a plurality of locations in the circumferential direction of the second supporter 192.

The second gear supporting part 192b is coupled to the second ring gear R32 of the second planetary gear mechanism 32 of the reduction device 3, and supports the second ring gear R32 so as to disable rotation in the circumferential direction. Here, the second gear supporting part 192b is coupled to the second ring gear R32 from the radial outer side R1 by spline fitting. In the present embodiment, the second gear supporting part 192b is formed more on the radial inner side R2 and more on the second axial side L2 than the second case coupling part 192a. The second gear supporting part 192b is continuously formed over the entire circumferential surface of the second supporter 192.

The second protruding wall part 192c protrudes more on the radial inner side R2 than the second gear supporting part 192b, and is continuously formed in the circumferential direction. As such, the second protruding wall part 192c is formed in a flange shape. The second protruding wall part 192c is formed over an area from the second gear supporting part 192b to the carrier supporting part 192d between the first planetary gear mechanism 31 and the second planetary gear mechanism 32 of the reduction device 3.

The carrier supporting part 192d rotatably supports the supported part C32a of the second carrier C32 of the second planetary gear mechanism 32 of the reduction device 3 through the carrier bearing 66. In the present embodiment, the carrier supporting part 192d is formed at an end portion of the second supporter 192 on the radial inner side R2. The carrier supporting part 192d is continuously formed over the entire circumferential surface of the second supporter 192.

As described above, the supporting member 109 according to the second embodiment includes the first supporter 191 and the second supporter 192. The first supporter 191 is coupled to the case main body 11 of the case 1 at the first case coupling part 191a. As described above, since the term "coupling" does not include molecular coupling of two members, the first supporter 191 is a different member than the case 1. The first supporter 191 is coupled to the first ring gear R31 and unrotatably supports the first ring gear R31 at the first gear supporting part 191b. Likewise, since the term "coupling" does not include molecular coupling of two members, the first supporter 191 is a different member than the first ring gear R31. The first supporter 191 rotatably supports the rotor shaft 27 at the shaft supporting part 191d. Furthermore, the first supporter 191 includes the first protruding wall part 191c that protrudes more on the radial inner side R2 than the first gear supporting part 191b and that is continuously formed in the circumferential direction.

In addition, the second supporter 192 is coupled to the case main body 11 of the case 1 at the second case coupling part 192a. As described above, since the term "coupling" does not include molecular coupling of two members, the second supporter 192 is a different member than the case 1. The second supporter 192 is coupled to the second ring gear R32 and unrotatably supports the second ring gear R32 at the second gear supporting part 192b. Likewise, since the term "coupling" does not include molecular coupling of two members, the second supporter 192 is a different member than the second ring gear R32. The second supporter 192 rotatably supports the second carrier C32 at the carrier supporting part 192d. Furthermore, the second supporter 192 includes the second protruding wall part 192c that protrudes more on the radial inner side R2 than the second gear supporting part 192b and that is continuously formed in the circumferential direction.

3. Third Embodiment

Figure 5:
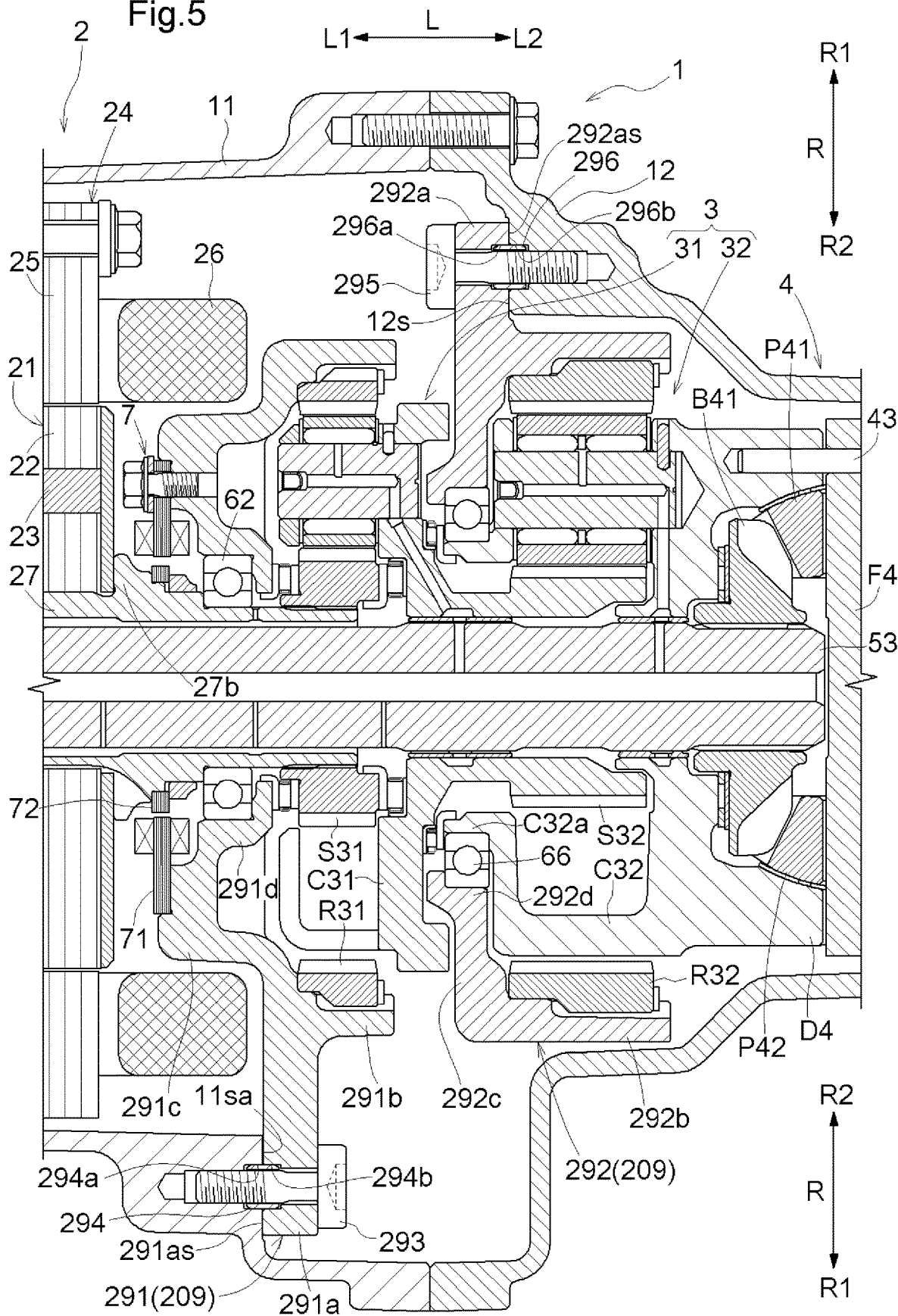
FIG. 5 is an axial cross-sectional view of a main part of a vehicle drive device according to a third embodiment.

The following describes a third embodiment of a vehicle drive device, using FIG. 5. In the present embodiment, a supporting member 209 different than the supporting members 9 and 109 of the first and second embodiments is provided. The following mainly describes differences from the above-described embodiments. Note that points that are not particularly described are the same as those of the above-described first embodiment.

As shown in FIG. 5, the supporting member 209 is provided inside the case 1, and is disposed between the rotating electrical machine 2 and the differential gear device 4 in the axial direction L. The supporting member 209 is not integrally formed with members that form the case 1 and the reduction device 3 of the vehicle drive device 100, but is formed as a different member than those members. The supporting member 209 includes a first supporter 291 and a second supporter 292. The present embodiment differs from the above-described second embodiment in that the first supporter 291 and the second supporter 292 are coupled to different members of the case 1. Specifically, in the present embodiment, the first supporter 291 is coupled to the case main body 11 of the case 1, and the second supporter 292 is coupled to the main body cover 12 of the case 1.

The first supporter 291 includes a first case coupling part 291a, a first gear supporting part 291b, a first protruding wall part 291c, and a shaft supporting part 291d.

The first case coupling part 291a is coupled to the case main body 11 of the case 1. The first case coupling part 291a is supported by the case 1, being in plane contact with the case main body 11 of the case 1. A contact surface between the first case coupling part 291a and the case main body 11 lies in the direction orthogonal to the axial direction L. Specifically, a first coupling-part contact surface 291as extending in the direction orthogonal to the axial direction L is formed at a portion of the first case coupling part 291a facing the case main body 11, and the first coupling-part contact surface 291as of the first case coupling part 291a and the first case contact surface 11sa of the case main body 11 are in contact with each other.

In the present embodiment, the first case coupling part 291a is coupled to the case main body 11 with a first bolt 293. The first bolt 293 is screwed into the case main body 11, with the first bolt 293 passing through the first case coupling part 291a in the axial direction L. The first bolt 293 is disposed so as to pass through a cylindrical first pin 294. The first pin 294 is used for positioning upon coupling the first case coupling part 291a to the case main body 11.

The first pin 294 is formed so as to extend in the axial direction L from a boundary portion between the first case coupling part 291a and the case main body 11, with the first case coupling part 291a coupled to the case main body 11 with the first bolt 293. A first press-fitting groove 294a into which the first pin 294 is press-fit is formed in a bolt-hole of the case main body 11, and a first insertion groove 294b into which the first pin 294 is inserted is formed in a bolt-hole of the first case coupling part 291a. The first press-fitting groove 294a is formed in the axial direction L from the first case contact surface 11sa. The inside diameter of the first press-fitting groove 294a is the same as or smaller than the outside diameter of the first pin 294. The first insertion groove 294b is formed in the axial direction L from the first coupling-part contact surface 291as. The inside diameter of the first insertion groove 294b is larger than the outside diameter of the first pin 294. Hence, in a state in which the first pin 294 is inserted into the first insertion groove 294b, circumferential vibration of the first case coupling part 291a with respect to the case main body 11 is allowed. Thus, regardless of the presence of the first pin 294, circumferential vibration occurring in the first ring gear R31 supported by the first supporter 291 is attenuated by circumferential friction occurring between the first case contact surface 11sa and the first coupling-part contact surface 291as.

In the present embodiment, the first case coupling part 291a is formed at an end portion of the first supporter 291 on the radial outer side R1. The first case coupling part 291a is formed at one or a plurality of locations in the circumferential direction of the first supporter 291.

The first gear supporting part 291b is coupled to the first ring gear R31 of the first planetary gear mechanism 31 of the reduction device 3, and supports the first ring gear R31 so as to disable rotation in the circumferential direction. Here, the first gear supporting part 291b is coupled to the first ring gear R31 from the radial outer side R1 by spline fitting. In the present embodiment, the first gear supporting part 291b is formed more on the radial inner side R2 than the first case coupling part 291a. The first gear supporting part 291b is continuously formed over the entire circumferential surface of the first supporter 291.

The first protruding wall part 291c protrudes more on the radial inner side R2 than the first gear supporting part 291b, and is continuously formed in the circumferential direction. As such, the first protruding wall part 291c is formed in a flange shape. The first protruding wall part 291c is formed over an area from the first gear supporting part 291b to the shaft supporting part 291d between the rotating electrical machine 2 and the first planetary gear mechanism 31 of the reduction device 3. In addition, the first detector 71 of the rotational position sensor 7 is provided on the first protruding wall part 291c.

The shaft supporting part 291d rotatably supports the second supported part 27b of the rotor shaft 27 of the rotating electrical machine 2 through the second rotor bearing 62. In the present embodiment, the shaft supporting part 291d is formed at an end portion of the first supporter 291 on the radial inner side R2. The shaft supporting part 291d is continuously formed over the entire circumferential surface of the first supporter 291.

The second supporter 292 includes a second case coupling part 292a, a second gear supporting part 292b, a second protruding wall part 292c, and a carrier supporting part 292d.

The second case coupling part 292a is coupled to the main body cover 12 of the case 1. The second case coupling part 292a is supported by the case 1, being in plane contact with the main body cover 12 of the case 1. A contact surface between the second case coupling part 292a and the main body cover 12 lies in the direction orthogonal to the axial direction L. Specifically, a second coupling-part contact surface 292as extending in the direction orthogonal to the axial direction L is formed at a portion of the second case coupling part 292a facing the main body cover 12, and a third case contact surface 12s extending in the direction orthogonal to the axial direction L is formed at a portion of the main body cover 12 facing the second case coupling part 292a. The second coupling-part contact surface 292as of the second case coupling part 292a and the third case contact surface 12s of the main body cover 12 are in contact with each other.

In the present embodiment, the second case coupling part 292a is coupled to the main body cover 12 with a second bolt 295. The second bolt 295 is screwed into the main body cover 12, with the second bolt 295 passing through the second case coupling part 292a in the axial direction L. The second bolt 295 is disposed so as to pass through a cylindrical second pin 296. The second pin 296 is used for positioning upon coupling the second case coupling part 292a to the main body cover 12.

The second pin 296 is formed so as to extend in the axial direction L from a boundary portion between the second case coupling part 292a and the main body cover 12, with the second case coupling part 292a coupled to the main body cover 12 with the second bolt 295. A second insertion groove 296a into which the second pin 296 is inserted is formed in a bolt-hole of the second case coupling part 292a, and a second press-fitting groove 296b into which the second pin 296 is press-fit is formed in a bolt-hole of the main body cover 12. The second press-fitting groove 296b is formed in the axial direction L from the third case contact surface 12s. The inside diameter of the second press-fitting groove 296b is the same as or smaller than the outside diameter of the second pin 296. The second insertion groove 296a is formed in the axial direction L from the second coupling-part contact surface 292as. The inside diameter of the second insertion groove 296a is larger than the outside diameter of the second pin 296. Hence, in a state in which the second pin 296 is inserted into the second insertion groove 296a, circumferential vibration of the second case coupling part 292a with respect to the main body cover 12 is allowed. Thus, regardless of the presence of the second pin 296, circumferential vibration occurring in the second ring gear R32 supported by the second supporter 292 is attenuated by circumferential friction occurring between the third case contact surface 12s and the second coupling-part contact surface 292as.

In the present embodiment, the second case coupling part 292a is formed at an end portion of the second supporter 292 on the radial outer side R1. The second case coupling part 292a is formed at one or a plurality of locations in the circumferential direction of the second supporter 292.

The second gear supporting part 292b is coupled to the second ring gear R32 of the second planetary gear mechanism 32 of the reduction device 3, and supports the second ring gear R32 so as to disable rotation in the circumferential direction. Here, the second gear supporting part 292b is coupled to the second ring gear R32 from the radial outer side R1 by spline fitting. In the present embodiment, the second gear supporting part 292b is formed more on the radial inner side R2 and more on the second axial side L2 than the second case coupling part 292a. The second gear supporting part 292b is continuously formed over the entire circumferential surface of the second supporter 292.

The second protruding wall part 292c protrudes more on the radial inner side R2 than the second gear supporting part 292b, and is continuously formed in the circumferential direction. As such, the second protruding wall part 292c is formed in a flange shape. The second protruding wall part 292c is formed over an area from the second gear supporting part 292b to the carrier supporting part 292d between the first planetary gear mechanism 31 and the second planetary gear mechanism 32 of the reduction device 3.

The carrier supporting part 292d rotatably supports the supported part C32a of the second carrier C32 of the second planetary gear mechanism 32 of the reduction device 3 through the carrier bearing 66. In the present embodiment, the carrier supporting part 292d is formed at an end portion of the second supporter 292 on the radial inner side R2. The carrier supporting part 292d is continuously formed over the entire circumferential surface of the second supporter 292.

As described above, the supporting member 209 according to the third embodiment includes the first supporter 291 and the second supporter 292. The first supporter 291 is coupled to the case main body 11 of the case 1 at the first case coupling part 291a. As described above, since the term "coupling" does not include molecular coupling of two members, the first supporter 291 is a different member than the case 1. The first supporter 291 is coupled to the first ring gear R31 and unrotatably supports the first ring gear R31 at the first gear supporting part 291b. Likewise, since the term "coupling" does not include molecular coupling of two members, the first supporter 291 is a different member than the first ring gear R31. The first supporter 291 rotatably supports the rotor shaft 27 at the shaft supporting part 291d. Furthermore, the first supporter 291 includes the first protruding wall part 291c that protrudes more on the radial inner side R2 than the first gear supporting part 291b and that is continuously formed in the circumferential direction.

In addition, the second supporter 292 is coupled to the main body cover 12 of the case 1 at the second case coupling part 292a. As described above, since the term "coupling" does not include molecular coupling of two members, the second supporter 292 is a different member than the case 1. The second supporter 292 is coupled to the second ring gear R32 and unrotatably supports the second ring gear R32 at the second gear supporting part 292b. Likewise, since the term "coupling" does not include molecular coupling of two members, the second supporter 292 is a different member than the second ring gear R32. The second supporter 292 rotatably supports the second carrier C32 at the carrier supporting part 292d. Furthermore, the second supporter 292 includes the second protruding wall part 292c that protrudes more on the radial inner side R2 than the second gear supporting part 292b and that is continuously formed in the circumferential direction.

4. Fourth Embodiment

Figure 6:
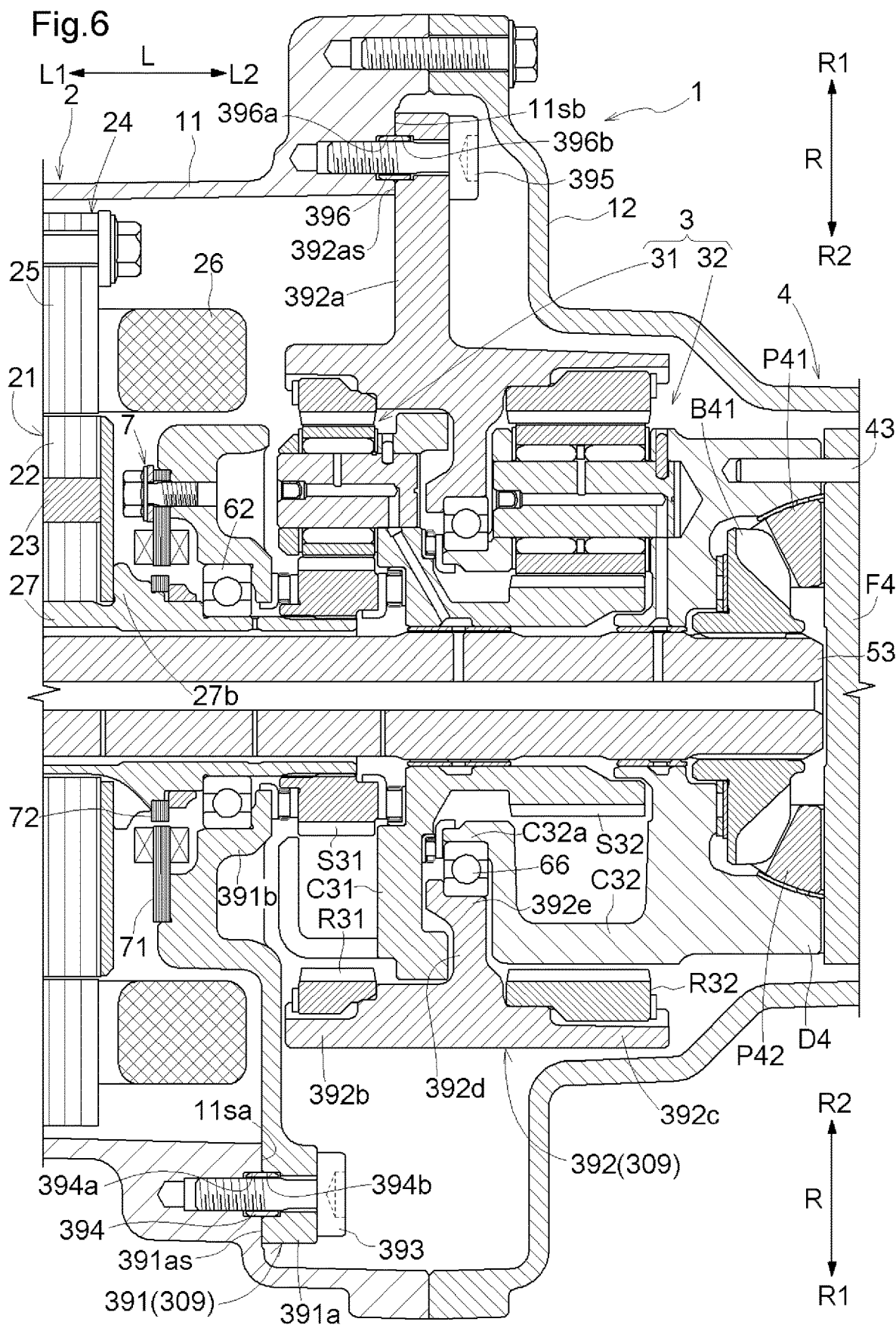
FIG. 6 is an axial cross-sectional view of a main part of a vehicle drive device according to a fourth embodiment.

The following describes a fourth embodiment of a vehicle drive device, using FIG. 6. In the present embodiment, a supporting member 309 different than the supporting members 9, 109, and 209 of the first to third embodiments is provided. The following mainly describes differences from the above-described embodiments. Note that points that are not particularly described are the same as those of the above-described first embodiment.

As shown in FIG. 6, the supporting member 309 is provided inside the case 1, and is disposed between the rotating electrical machine 2 and the differential gear device 4 in the axial direction L. The supporting member 309 is not integrally formed with members that form the case 1 and the reduction device 3 of the vehicle drive device 100, but is formed as a different member than those members. The supporting member 309 includes a first supporter 391 and a second supporter 392. The present embodiment differs from the above-described first to third embodiments in that the first supporter 291 does not support the ring gears R31 and R32 of the reduction device 3 and only the second supporter 292 supports the ring gears R31 and R32.

The first supporter 391 includes a first case coupling part 391a and a shaft supporting part 391b.

The first case coupling part 391a is coupled to the case main body 11 of the case 1. The first case coupling part 391a is supported by the case 1, being in plane contact with the case main body 11 of the case 1. A contact surface between the first case coupling part 391a and the case main body 11 lies in the direction orthogonal to the axial direction L. Specifically, a first coupling-part contact surface 391as extending in the direction orthogonal to the axial direction L is formed at a portion of the first case coupling part 391a facing the case main body 11, and the first coupling-part contact surface 391as of the first case coupling part 391a and the first case contact surface 11sa of the case main body 11 are in contact with each other.

In the present embodiment, the first case coupling part 391a is coupled to the case main body 11 with a first bolt 393. The first bolt 393 is screwed into the case main body 11, with the first bolt 393 passing through the first case coupling part 391a in the axial direction L. The first bolt 393 is disposed so as to pass through a cylindrical first pin 394. The first pin 394 is used for positioning upon coupling the first case coupling part 391a to the case main body 11.

The first pin 394 is formed so as to extend in the axial direction L from a boundary portion between the first case coupling part 391a and the case main body 11, with the first case coupling part 391a coupled to the case main body 11 with the first bolt 393. A first press-fitting groove 394a into which the first pin 394 is press-fit is formed in a bolt-hole of the case main body 11, and a first insertion groove 394b into which the first pin 394 is inserted is formed in a bolt-hole of the first case coupling part 391a. The first press-fitting groove 394a is formed in the axial direction L from the first case contact surface 11sa. The inside diameter of the first press-fitting groove 394a is the same as or smaller than the outside diameter of the first pin 394. The first insertion groove 394b is formed in the axial direction L from the first coupling-part contact surface 391as. The inside diameter of the first insertion groove 394b is larger than the outside diameter of the first pin 394. Hence, in a state in which the first pin 394 is inserted into the first insertion groove 394b, circumferential vibration of the first case coupling part 391a with respect to the case main body 11 is allowed. Thus, regardless of the presence of the first pin 394, circumferential vibration occurring in the first ring gear R31 supported by the first supporter 391 is attenuated by circumferential friction occurring between the first case contact surface 11sa and the first coupling-part contact surface 391as.

In the present embodiment, the first case coupling part 391a is formed at an end portion of the first supporter 391 on the radial outer side R1. The first case coupling part 391a is formed at one or a plurality of locations in the circumferential direction of the first supporter 391.

The shaft supporting part 391b rotatably supports the second supported part 27b of the rotor shaft 27 of the rotating electrical machine 2 through the second rotor bearing 62. In the present embodiment, the shaft supporting part 391b is formed at an end portion of the first supporter 391 on the radial inner side R2. The shaft supporting part 391b is continuously formed over the entire circumferential surface of the first supporter 391.

The second supporter 392 includes a second case coupling part 392a, a first gear supporting part 392b, a second gear supporting part 392c, a protruding wall part 392d, and a carrier supporting part 392e.

The second case coupling part 392a is coupled to the case main body 11 of the case 1. The second case coupling part 392a is supported by the case 1, being in plane contact with the case main body 11 of the case 1. A contact surface between the second case coupling part 392a and the case main body 11 lies in the direction orthogonal to the axial direction L. Specifically, a second coupling-part contact surface 392as extending in the direction orthogonal to the axial direction L is formed at a portion of the second case coupling part 392a facing the case main body 11, and the second coupling-part contact surface 392as of the second case coupling part 392a and the second case contact surface 11sb of the case main body 11 are in contact with each other.

In the present embodiment, the second case coupling part 392a is coupled to the case main body 11 with a second bolt 395. The second bolt 395 is screwed into the case main body 11, with the second bolt 395 passing through the second case coupling part 392a in the axial direction L. The second bolt 395 is disposed so as to pass through a cylindrical second pin 396. The second pin 396 is used for positioning upon coupling the second case coupling part 392a to the case main body 11.

The second pin 396 is formed so as to extend in the axial direction L from a boundary portion between the second case coupling part 392a and the case main body 11, with the second case coupling part 392a coupled to the case main body 11 with the second bolt 395. A second press-fitting groove 396a into which the second pin 396 is press-fit is formed in a bolt-hole of the case main body 11, and a second insertion groove 396b into which the second pin 396 is inserted is formed in a bolt-hole of the second case coupling part 392a. The second press-fitting groove 396a is formed in the axial direction L from the second case contact surface 11sb. The inside diameter of the second press-fitting groove 396a is the same as or smaller than the outside diameter of the second pin 396. The second insertion groove 396b is formed in the axial direction L from the second coupling-part contact surface 392as. The inside diameter of the second insertion groove 396b is larger than the outside diameter of the second pin 396. Hence, in a state in which the second pin 396 is inserted into the second insertion groove 396b, circumferential vibration of the second case coupling part 392a with respect to the case main body 11 is allowed. Thus, regardless of the presence of the second pin 396, circumferential vibration occurring in the second ring gear R32 supported by the second supporter 392 is attenuated by circumferential friction occurring between the second case contact surface 11sb and the second coupling-part contact surface 392as.

A location where the second case coupling part 392a of the second supporter 392 is coupled to the case main body 11 differs in the position in the axial direction L from a location where the first case coupling part 391a of the first supporter 391 is coupled to the case main body 11. In addition, the location where the second case coupling part 392a of the second supporter 392 is coupled to the case main body 11 differs also in the position in the circumferential direction from the location where the first case coupling part 391a of the first supporter 391 is coupled to the case main body 11. In the present embodiment, the second case coupling part 392a is formed at an end portion of the second supporter 392 on the radial outer side R1. The second case coupling part 392a is formed at one or a plurality of locations in the circumferential direction of the second supporter 392.

The first gear supporting part 392b is coupled to the first ring gear R31 of the first planetary gear mechanism 31 of the reduction device 3, and supports the first ring gear R31 so as to disable rotation in the circumferential direction. Here, the first gear supporting part 392b is coupled to the first ring gear R31 on the radial outer side R1 by spline fitting. In the present embodiment, the first gear supporting part 392b is formed more on the radial inner side R2 and more on the first axial side L1 than the second case coupling part 392a. The first gear supporting part 392b is continuously formed over the entire circumferential surface of the second supporter 392.

The second gear supporting part 392c is coupled to the second ring gear R32 of the second planetary gear mechanism 32 of the reduction device 3, and supports the second ring gear R32 so as to disable rotation in the circumferential direction. Here, the second gear supporting part 392c is coupled to the second ring gear R32 on the radial outer side R1 by spline fitting. In the present embodiment, the second gear supporting part 392c is formed more on the radial inner side R2 and more on the second axial side L2 than the second case coupling part 392a. The second gear supporting part 392c is formed more on the second axial side L2 than the first gear supporting part 392b so as to be aligned in the radial direction R with the first gear supporting part 392b. The second gear supporting part 392c is integrally formed with the first gear supporting part 392b. The second gear supporting part 392c is continuously formed over the entire circumferential surface of the second supporter 392.

The protruding wall part 392d protrudes more on the radial inner side R2 than the first gear supporting part 392b and the second gear supporting part 392c, and is continuously formed in the circumferential direction. As such, the protruding wall part 392d is formed in a flange shape. The protruding wall part 392d is formed over an area from a connecting portion between the first gear supporting part 392b and the second gear supporting part 392c to the carrier supporting part 392e between the first planetary gear mechanism 31 and the second planetary gear mechanism 32 of the reduction device 3.

The carrier supporting part 392e rotatably supports the supported part C32a of the second carrier C32 of the second planetary gear mechanism 32 of the reduction device 3 through the carrier bearing 66. In the present embodiment, the carrier supporting part 392e is formed at an end portion of the second supporter 392 on the radial inner side R2. The carrier supporting part 392e is continuously formed over the entire circumferential surface of the second supporter 392.

As described above, the supporting member 309 according to the fourth embodiment includes the first supporter 391 and the second supporter 392. The first supporter 391 is coupled to the case main body 11 of the case 1 at the first case coupling part 391a. As described above, since the term "coupling" does not include molecular coupling of two members, the first supporter 391 is a different member than the case 1. The first supporter 391 rotatably supports the rotor shaft 27 at the shaft supporting part 391b.

In addition, the second supporter 392 is coupled to the case main body 11 of the case 1 at the second case coupling part 392a. As described above, since the term "coupling" does not include molecular coupling of two members, the second supporter 392 is a different member than the case 1. The second supporter 392 is coupled to the first ring gear R31 and unrotatably supports the first ring gear R31 at the first gear supporting part 392b. Furthermore, the second supporter 392 is coupled to the second ring gear R32 and unrotatably supports the second ring gear R32 at the second gear supporting part 392c. Likewise, since the term "coupling" does not include molecular coupling of two members, the second supporter 192 is a different member than the first ring gear R31 and the second ring gear R32. The second supporter 392 rotatably supports the second carrier C32 at the carrier supporting part 392e. Furthermore, the second supporter 392 includes the protruding wall part 392d that protrudes more on the radial inner side R2 than the first gear supporting part 392b and the second gear supporting part 392c and that is continuously formed in the circumferential direction.

5. Fifth Embodiment

Figure 7:
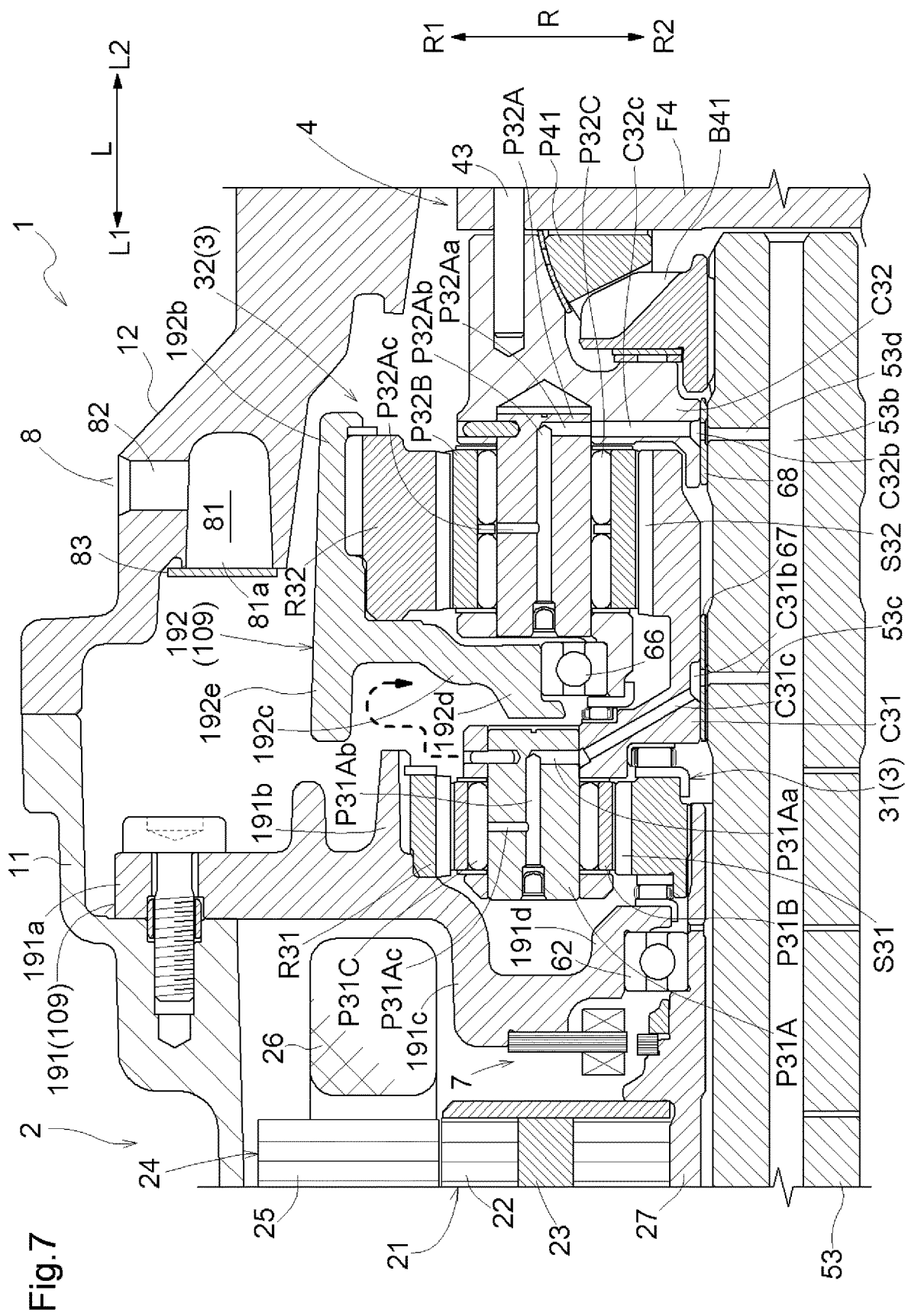
FIG. 7 is an axial cross-sectional view of a main part of a vehicle drive device according to a fifth embodiment.

The following describes a fifth embodiment of a vehicle drive device, using FIG. 7. In the present embodiment, the configuration is substantially the same as that of the above-described second embodiment, but the present embodiment differs from the second embodiment in that a breather mechanism 8 (breather) is provided. The following mainly describes differences from the second embodiment. Note that points that are not particularly described are the same as those of the second embodiment.

Though description is omitted in the above-described first to fourth embodiments, as shown in FIG. 7, the first planetary gear mechanism 31 includes a first pinion shaft P31A, first pinion gears P31B, and a first pinion bearing P31C. In addition, the second planetary gear mechanism 32 includes a second pinion shaft P32A, second pinion gears P32B, and a second pinion bearing P32C.

The first pinion shaft P31A is a shaft member extending in the axial direction L. The first pinion shaft P31A is fixed to the first carrier C31. The first pinion gears P31B are rotatably supported by the first pinion shaft P31A through the first pinion bearing P31C. The first pinion gears P31B are disposed so as to mesh with the first sun gear S31 and the first ring gear R31. Each first pinion gear P31B is configured to turn (rotate) around its central axis and turn (revolve) around the first sun gear S31. Note that, though not shown, the plurality of first pinion gears P31B are provided along their revolution paths and with spacing therebetween. In the example shown, the first pinion bearing P31C is a needle bearing.

The second pinion shaft P32A is a shaft member extending in the axial direction L. The second pinion shaft P32A is fixed to the second carrier C32. The second pinion gears P32B are rotatably supported by the second pinion shaft P32A through the second pinion bearing P32C. The second pinion gears P32B are disposed so as to mesh with the second sun gear S32 and the second ring gear R32. Each second pinion gear P32B is configured to turn (rotate) around its central axis and turn (revolve) around the second sun gear S32. Note that, though not shown, the plurality of second pinion gears P32B are provided along their revolution paths and with spacing therebetween. In the example shown, the second pinion bearing P32C is a needle bearing.

Though description is omitted in the above-described first to fourth embodiments, oil passages are formed in the intermediate shaft 53 and the planetary gear mechanisms 31 and 32. As shown in FIG. 7, the intermediate shaft 53 includes an in-shaft oil passage 53b, first distribution oil passages 53c, and second distribution oil passages 53d.

The in-shaft oil passage 53b is an oil passage extending in the axial direction L inside the intermediate shaft 53. Oil discharged from a hydraulic pump which is not shown is supplied to the in-shaft oil passage 53b. The oil supplied to the in-shaft oil passage 53b is supplied to a first-carrier oil passage C31c formed in the first carrier C31 through a corresponding first distribution oil passage 53c, and is supplied to a second-carrier oil passage C32c formed in the second carrier C32 through a corresponding second distribution oil passage 53d. The first distribution oil passages 53c and the second distribution oil passages 53d communicate between the in-shaft oil passage 53b and an outer surface of the intermediate shaft 53. The first distribution oil passages 53c and the second distribution oil passages 53d extend in the radial direction R. In addition, the plurality of first distribution oil passages 53c and the plurality of second distribution oil passages 53d are formed in the circumferential direction of the intermediate shaft 53.

The first carrier C31 includes a first-carrier groove part C31b and the first-carrier oil passage C31c.

The first-carrier groove part C31b is a groove formed in a surface of the first carrier C31 facing the outer surface of the intermediate shaft 53. The first-carrier groove part C31b is continuously formed in the circumferential direction of the first carrier C31. The first-carrier groove part C31b is disposed so as to communicate with a corresponding first distribution oil passage 53c. Specifically, a first slide bearing 67 such as a bushing is interposed between the first carrier C31 and the intermediate shaft 53, and the first-carrier groove part C31b and the first distribution oil passage 53c communicate with each other through a through-hole made in the radial direction R in the first slide bearing 67.

The first-carrier oil passage C31c is an oil passage formed inside the first carrier C31. The first-carrier oil passage C31c communicates between the first-carrier groove part C31b and a first introduction oil passage P31Aa formed in the first pinion shaft P31A.

The first pinion shaft P31A includes the first introduction oil passage P31Aa, a first in-shaft oil passage P31Ab, and a first supply oil passage P31Ac. The first introduction oil passage P31Aa is an oil passage that communicates between the first-carrier oil passage C31c and the first in-shaft oil passage P31Ab. The first introduction oil passage P31Aa extends in the radial direction R. The first in-shaft oil passage P31Ab is an oil passage extending in the axial direction L inside the first pinion shaft P31A. The first supply oil passage P31Ac is an oil passage that communicates between the first in-shaft oil passage P31Ab and an outer surface of the first pinion shaft P31A. The first supply oil passage P31Ac is formed so as to open at a portion of the outer surface of the first pinion shaft P31A facing the first pinion bearing P31C. The first supply oil passage P31Ac extends in the radial direction R.

Some of the oil supplied to the in-shaft oil passage 53b is supplied to the first pinion bearing P31C by passing through the corresponding first distribution oil passage 53c, the first-carrier groove part C31b, the first-carrier oil passage C31c, the first introduction oil passage P31Aa, the first in-shaft oil passage P31Ab, and the first supply oil passage P31Ac in turn. The oil supplied to the first pinion bearing P31C lubricates the first pinion bearing P31C, and then lubricates a meshing portion of each gear of the first planetary gear mechanism 31, etc., and then is scattered toward the radial outer side R1 by centrifugal force generated by rotation of each gear and the first carrier C31.

The second carrier C32 includes a second-carrier groove part C32b and the second-carrier oil passage C32c.

The second-carrier groove part C32b is a groove formed in a surface of the second carrier C32 facing the outer surface of the intermediate shaft 53. The second-carrier groove part C32b is continuously formed in the circumferential direction of the second carrier C32. The second-carrier groove part C32b is disposed so as to communicate with a corresponding second distribution oil passage 53d. Specifically, a second slide bearing 68 such as a bushing is interposed between the second carrier C32 and the intermediate shaft 53, and the second-carrier groove part C32b and the second distribution oil passage 53d communicate with each other through a through-hole made in the radial direction R in the second slide bearing 68.

The second-carrier oil passage C32c is an oil passage formed inside the second carrier C32. The second-carrier oil passage C32c communicates between the second-carrier groove part C32b and a second introduction oil passage P32Aa formed in the second pinion shaft P32A.

The second pinion shaft P32A includes the second introduction oil passage P32Aa, a second in-shaft oil passage P32Ab, and a second supply oil passage P32Ac. The second introduction oil passage P32Aa is an oil passage that communicates between the second-carrier oil passage C32c and the second in-shaft oil passage P32Ab. The second introduction oil passage P32Aa extends in the radial direction R. The second in-shaft oil passage P32Ab is an oil passage extending in the axial direction L inside the second pinion shaft P32A. The second supply oil passage P32Ac is an oil passage that communicates between the second in-shaft oil passage P32Ab and an outer surface of the second pinion shaft P32A. The second supply oil passage P32Ac is formed so as to open at a portion of the outer surface of the second pinion shaft P32A facing the second pinion bearing P32C. The second supply oil passage P32Ac extends in the radial direction R.

Some of the oil supplied to the in-shaft oil passage 53b is supplied to the second pinion bearing P32C by passing through the corresponding second distribution oil passage 53d, the second-carrier groove part C32b, the second-carrier oil passage C32c, the second introduction oil passage P32Aa, the second in-shaft oil passage P32Ab, and the second supply oil passage P32Ac in turn. The oil supplied to the second pinion bearing P32C lubricates the second pinion bearing P32C, and then lubricates a meshing portion of each gear of the second planetary gear mechanism 32, etc., and then is scattered toward the radial outer side R1 by centrifugal force generated by rotation of each gear and the second carrier C32.

As shown in FIG. 7, the breather mechanism 8 includes a breather chamber 81, a breather hole 82, and a shielding member 83.

The breather chamber 81 is formed in the case 1. The breather chamber 81 is formed such that an inner opening part 81a opens inside the case 1. In the present embodiment, the breather chamber 81 is formed in the main body cover 12 such that the inner opening part 81a opens toward the first axial side L1.

The breather hole 82 is made in the case 1 so as to communicate between the breather chamber 81 and the outside of the case 1. In the present embodiment, the breather hole 82 is made in the main body cover 12 in the radial direction R. Note that the breather hole 82 may be provided with a breather plug that reduces pressure in the case 1 by discharging gas in the case 1 outside when the pressure in the case 1 has reached greater than or equal to a predetermined value.

The shielding member 83 is disposed so as to cover the inner opening part 81a. The shielding member 83 is fixed to the case 1. In the present embodiment, the shielding member 83 is formed in a plate-like form and fixed to the main body cover 12. There is a gap which is not shown between the shielding member 83 and the case 1, and the breather chamber 81 and the inside of the case 1 communicate with each other through the gap.

In the present embodiment, the breather mechanism 8 is disposed at a location where the breather mechanism 8 overlaps the second gear supporting part 192b of the second supporter 192 as viewed in the radial direction R. In the present embodiment, the second gear supporting part 192b corresponds to an "axial extending part" (axial extension) extending in the axial direction L.

Here, regarding the disposition of two members, the expression "the two members overlap each other as viewed in a specific direction" refers to that when an imaginary straight line parallel to the line-of-sight direction is moved to each direction orthogonal to the imaginary straight line, there is a region in which the imaginary straight line intersects both of the two members.

As described above, the oil supplied to the second pinion bearing P32C from the second supply oil passage P32Ac is scattered toward the radial outer side R1 by rotation of the second pinion gears P32B, the second carrier C32, and the like. In the present embodiment, since the second gear supporting part 192b extending in the axial direction L is disposed at a location where the second gear supporting part 192b overlaps the breather mechanism 8 as viewed in the radial direction R, movement of oil from more on the radial inner side R2 than the second gear supporting part 192b to the radial outer side R1 is hindered by the second gear supporting part 192b.

In addition, in the present embodiment, the second gear supporting part 192b of the second supporter 192 includes a cylindrical protruding part 192e (cylindrical protrusion) at a portion thereof on the first axial side L1 with respect to the inner opening part 81a of the breather mechanism 8, the cylindrical protruding part 192e protruding on the first axial side L1 and being continuously formed in the circumferential direction. On the radial inner side R2 with respect to the cylindrical protruding part 192e there is disposed at least one of the gears included in the reduction device 3. In the present embodiment, the first planetary gear mechanism 31 is disposed on the radial inner side R2 with respect to the cylindrical protruding part 192e. That is, the cylindrical protruding part 192e is disposed between the first planetary gear mechanism 31 and the inner opening part 81a of the breather mechanism 8 in the radial direction R.

As described above, the oil supplied to the first pinion bearing P31C from the first supply oil passage P31Ac is scattered toward the radial outer side R1 by rotation of the first pinion gears P31B, the first carrier C31, and the like. In the present embodiment, since the cylindrical protruding part 192e is disposed in an oil scattering path from the first planetary gear mechanism 31 to the inner opening part 81a of the breather mechanism 8, movement of oil from the first planetary gear mechanism 31 to the inner opening part 81a is hindered by the cylindrical protruding part 192e (see a thick dashed line arrow shown in FIG. 7).

6. Other Embodiments (1) The above-described embodiments describe, as examples, a configuration in which the first supporter of the supporting member supports the first ring gear and the second supporter supports the second ring gear (the first embodiment, the second embodiment, and the third embodiment) and a configuration in which the second supporter of the supporting member supports both the first ring gear and the second ring gear (the fourth embodiment). However, the configurations are not limited thereto, and for example, the configuration may be such that the first supporter of the supporting member supports both the first ring gear and the second ring gear.

(2) The above-described embodiments describe, as an example, a configuration in which the rotor shaft of the rotating electrical machine functions as a "rotating member" and is rotatably supported by the first supporter of the supporting member. However, the configuration is not limited thereto, and for example, the configuration may be such that the first sun gear of the first planetary gear mechanism of the reduction device functions as a "rotating member" and is rotatably supported by the first supporter of the supporting member.

(3) The above-described embodiments describe, as examples, a configuration in which the first supporter and the second supporter of the supporting member are coupled to each other and the first supporter is coupled to the case main body of the case (the first embodiment), a configuration in which both the first supporter and the second supporter of the supporting member are coupled to the case main body of the case (the second embodiment and the fourth embodiment), and a configuration in which the first supporter of the supporting member is coupled to the case main body of the case and the second supporter is coupled to the main body cover of the case (the third embodiment). However, the configurations are not limited thereto, and for example, the configuration may be such that the first supporter and the second supporter of the supporting member are coupled to each other and the second supporter is coupled to the case, or such that both the first supporter and the second supporter of the supporting member are coupled to the main body cover of the case.

(4) The above-described embodiments describe, as an example, a configuration in which the ring gears are directly coupled to the supporting member and are unrotatably supported by the supporting member. However, the configuration is not limited thereto, and the configuration may be such that the ring gears are unrotatably supported by the supporting member through junction members. In addition, for example, a structure may be employed in which the ring gears and the supporting member are coupled to each other through torque limiters, and the ring gears are unrotatable at ordinary times, but when excessive torque acts, the ring gears rotate relative to the supporting member.

(5) The above-described fifth embodiment describes, as an example, a configuration in which the breather mechanism 8 is provided in the main body cover 12. However, the configuration is not limited thereto, and for example, the breather mechanism 8 may be provided in the case main body 11.

(6) The above-described fifth embodiment describes, as an example, a configuration in which the inner opening part 81a of the breather chamber 81 opens toward the first axial side L1. However, the configuration is not limited thereto, and for example, the configuration may be such that the inner opening part 81a opens toward the second axial side L2, or such that the inner opening part 81a opens toward the radial inner side R2.

(7) The above-described fifth embodiment describes, as an example, a configuration in which the second gear supporting part 192b of the second supporter 192 is an "axial extending part". However, the configuration is not limited thereto, and for example, the configuration may be such that the first gear supporting part 191b of the first supporter 191 corresponds to an "axial extending part". In addition, a gear supporting part of a supporter in embodiments other than the fifth embodiment may be an "axial extending part".

(8) The above-described fifth embodiment describes, as an example, a configuration in which the second gear supporting part 192b of the second supporter 192 includes the cylindrical protruding part 192e protruding on the first axial side L1. However, the configuration is not limited thereto, and for example, the configuration may be such that the first gear supporting part 191b of the first supporter 191 includes a cylindrical protruding part protruding on the second axial side L2.

(9) The above-described embodiments describe, as an example, a configuration in which the supporting member includes the protruding wall parts. However, the configuration is not limited thereto, and the configuration may be such that the supporting member does not include the protruding wall parts.

(10) The above-described embodiments describe, as an example, a configuration in which the case and the supporting member are coupled to each other with the bolts. However, the configuration is not limited thereto, and the configuration may be such that the case and the supporting member are coupled to each other with, for example, rivets.

(11) The above-described embodiments describe, as an example, a configuration in which the carrier is integrated with the differential case, and the carrier and the differential case are rotatably supported through the bearing supported by the supporting member. However, the configuration is not limited thereto, and the configuration may be such that the carrier and the differential case are independent of each other and are rotatably supported through different bearings.

7. Summary of the Above-Described Embodiments

A summary of the vehicle drive device (100) described above will be described below.

A vehicle drive device (100) includes:

a rotating electrical machine (2) serving as a drive power source for a first wheel (501) and a second wheel (502);

a differential gear device (4) that distributes drive power from the rotating electrical machine (2) to the first wheel (501) and the second wheel (502);

a reduction device (3) including a planetary gear mechanism (31, 32) including a sun gear (S31, S32), a carrier (C31, C32), and a ring gear (R31, R32); and a case (1) that accommodates the rotating electrical machine (2), the differential gear device (4), and the reduction device (3), and the differential gear device (4) and the reduction device (3) are disposed coaxially with the rotating electrical machine (2), the reduction device (3) is disposed between the rotating electrical machine (2) and the differential gear device (4) in an axial direction (L), a supporting member (9, 109, 209, 309) disposed inside the case (1) is supported by the case (1), the ring gear (R31, R32) is unrotatably supported by the supporting member (9, 109, 209, 309), the case (1) and the supporting member (9, 109, 209, 309) are in plane contact with each other, and a contact surface (11sa, 11sb, 12s, 91as, 191as, 192as, 291as, 292as, 391as, 392as) between the case (1) and the supporting member (9, 109, 209, 309) lies in a direction (R) orthogonal to the axial direction (L).

According to this configuration, the supporting member (9, 109, 209, 309) disposed inside the case (1) is supported by the case (1), and the ring gear (R31, R32) is unrotatably supported by the supporting member (9, 109, 209, 309). That is, the ring gear (R31, R32) is supported by the case (1) through the supporting member (9, 109, 209, 309) which is a different member than the case (1) and the ring gear (R31, R32). Hence, vibration occurring in a meshing portion between a pinion gear supported by the carrier (C31, C32) and the ring gear (R31, R32) is attenuated at a point between the ring gear (R31, R32) and the supporting member (9, 109, 209, 309), the supporting member (9, 109, 209, 309), and a point between the supporting member (9, 109, 209, 309) and the case (1), before transmitted to the case (1). Particularly, between the ring gear (R31, R32) and the supporting member (9, 109, 209, 309) and between the supporting member (9, 109, 209, 309) and the case (1), the vibration can be attenuated by friction occurring by contact between the members.

In addition, according to this configuration, the case (1) and the supporting member (9, 109, 209, 309) are in contact with each other at the contact surface (11sa, 11sb, 12s, 91as, 191as, 192as, 291as, 292as, 391as, 392as) lying in the direction (R) orthogonal to the axial direction (L). Hence, circumferential vibration occurring in the ring gear (R31, R32) is transmitted to the contact surface (11sa, 11sb, 12s, 91as, 191as, 192as, 291as, 292as, 391as, 392as) between the case (1) and the supporting member (9, 109, 209, 309), and is attenuated by circumferential friction occurring in the contact surface.

As described above, according to this configuration, vibration transmitted from the reduction device (3) to the case (1) can be reduced to a small level, and as a result, gear noise transmitted from the case (1) to the outside can also be reduced to a small level.

Here, it is preferred that the supporting member (9, 109, 209, 309) include a protruding wall part (91d, 92c, 191c, 192c, 291c, 292c, 392d) that protrudes more on a radial inner side (R2) than a supporting part (91c, 92b, 191b, 192b, 291b, 292b, 392b, 392c) and that is continuously formed in a circumferential direction, the supporting part (91c, 92b, 191b, 192b, 291b, 292b, 392b, 392c) unrotatably supporting the ring gear (R31, R32).

According to this configuration, the ring gear (R31, R32) is supported by the case (1) through the supporting member (9, 109, 209, 309) whose stiffness is increased by the protruding wall part (91d, 92c, 191c, 192c, 291c, 292c, 392d). Hence, vibration of the supporting member (9, 109, 209, 309) caused by vibration occurring in a meshing portion between a pinion gear supported by the carrier (C31, C32) and the ring gear (R31, R32) can be reduced to a small level. Therefore, vibration transmitted from the reduction device (3) to the case (1) can be further reduced to a small level, and as a result, gear noise transmitted from the case (1) to the outside can also be further reduced to a small level.

In addition, it is preferred that the case (1) and the supporting member (9, 109, 209, 309) be coupled to each other with a bolt (93, 95, 193, 195, 293, 295, 393, 395).

According to this configuration, a state in which the supporting member (9, 109, 209, 309) is supported by the case (1) in plane contact with each other can be implemented by a simple configuration.

Here, the above-described configuration is particularly preferable for when the case (1) includes a cylindrical surrounding wall part that encloses radial outer sides (R1) of the rotating electrical machine (2), the differential gear device (4), and the reduction device (3). This is because in such a configuration, radiated sound from a case surface which occurs due to vibration transmitted to the case (1) is likely to increase, and as a result, gear noise transmitted to the outside is likely to increase.

Here, it is preferred that the reduction device (3) further include a second planetary gear mechanism (32) including a second sun gear (S32), a second carrier (C32), and a second ring gear (R32), in addition to a first planetary gear mechanism (31) which is the planetary gear mechanism and includes a first sun gear (S31) which is the sun gear, a first carrier (C31) which is the carrier, and a first ring gear (R31) which is the ring gear, the first planetary gear mechanism (31) be disposed more on the rotating electrical machine (2) side in the axial direction (L) than the second planetary gear mechanism (32), and the supporting member (9, 109, 209, 309) support both the first ring gear (R31) and the second ring gear (R32).

According to this configuration, even when the reduction device (3) includes two planetary gear mechanisms (31, 32), vibration transmitted from the reduction device (3) to the case (1) can be reduced to a small level, and gear noise transmitted from the case (1) to the outside can also be reduced to a small level.

As an example, in a configuration in which, as described above, the reduction device (3) includes two planetary gear mechanisms (31, 32), it is preferred that the supporting member (9, 109, 209) include a first supporter (91, 191, 291) and a second supporter (92, 192, 292), the first ring gear (R31) be supported by the first supporter (91, 191, 291), and the second ring gear (R32) be supported by the second supporter (92, 192, 292).

According to this configuration, vibration occurring in a meshing portion between a pinion gear supported by the first carrier (C31) and the first ring gear (R31) and vibration occurring in a meshing portion between a pinion gear supported by the second carrier (C32) and the second ring gear (R32) can be attenuated by different supporters. Thus, gear noise transmitted from the case (1) to the outside can be further reduced to a small level.

Here, it is preferred that one of the first supporter (91) and the second supporter (92) be supported by the case (1), and another one of the first supporter (91) and the second supporter (92) be coupled to one of the first supporter (91) and the second supporter (92).

According to this configuration, one of vibration occurring in a meshing portion between a pinion gear supported by the first carrier (C31) and the first ring gear (R31) and vibration occurring in a meshing portion between a pinion gear supported by the second carrier (C32) and the second ring gear (R32) can be attenuated by one supporter, and the other vibration can be attenuated by two supporters and a coupling portion of the two supporters. Thus, gear noise transmitted from the case (1) to the outside can be further reduced to a small level. In addition, since the configuration is such that only one of the first supporter (91) and the second supporter (92) is coupled to the case (1), a mounting structure of the supporting member (9) on the case (1) can be simplified. Thus, an increase in the size of the device can be suppressed.

Here, it is preferred that the first supporter (191, 291) and the second supporter (192, 292) be supported at different locations on the case (1).

According to this configuration, vibration occurring in a meshing portion between a pinion gear supported by the first carrier (C31) and the first ring gear (R31) and vibration occurring in a meshing portion between a pinion gear supported by the second carrier (C32) and the second ring gear (R32) can be attenuated by different supporters, and those vibrations can be transmitted to different locations on the case (1). Thus, the vibration of the case (1) itself can be reduced to a small level, and gear noise transmitted from the case (1) to the outside can be further reduced to a small level.

Alternatively, in a configuration in which, as described above, the reduction device (3) includes two planetary gear mechanisms (31, 32), it is preferred that the supporting member (309) include a first supporter (391) and a second supporter (392), each of the first supporter (391) and the second supporter (392) be supported by the case (1), and both the first ring gear (R31) and the second ring gear (R32) be supported by the second supporter (392).

According to this configuration, since both the first ring gear (R31) and the second ring gear (R32) are supported by only one of the two supporters, a support structure of the two ring gears (R31, R32) can be simplified. Thus, an increase in the size of the device can be suppressed.

In addition, it is preferred that the vehicle drive device further include a breather mechanism (8) that communicates between an inner opening part (81a) that opens inside the case (1) and outside of the case (1), the supporting member (109) include an axial extending part (192b) extending in the axial direction (L), and the breather mechanism (8) be disposed at a location where the breather mechanism (8) overlaps the axial extending part (192b) as viewed in a radial direction (R).

In general, in the vehicle drive device (100) including the case (1), oil for lubricating and cooling members accommodated in the case (1) is present inside the case (1). The oil is scattered inside the case (1) by the operation of the members accommodated in the case (1), particularly, by the rotation of rotating members such as gears.

According to this configuration, movement of oil from more on the radial inner side (R2) than the axial extending part (192b) of the supporting member (109) to the radial outer side (R1) is hindered by the axial extending part (192b) of the supporting member (109). Therefore, it is possible to make it difficult for oil to flow into the breather mechanism (8) disposed at a location where the breather mechanism (8) overlaps the axial extending part (192b) as viewed in the radial direction (R).

As an example, in a configuration in which, as described above, the supporting member (109) includes an axial extending part (192b) extending in the axial direction (L), it is preferred that the axial extending part (192b) include a cylindrical protruding part (192e) at a portion of the axial extending part (192b) on one side (L1) of the axial direction (L) with respect to the inner opening part (81a), the cylindrical protruding part (192e) protruding on the one side (L1) and being continuously formed in a circumferential direction, and at least one of gears included in the reduction device (3) be disposed on the radial inner side (R2) with respect to the cylindrical protruding part (192e).

According to this configuration, the cylindrical protruding part (192e) is disposed between a gear included in the reduction device (3) and the inner opening part (81a) of the breather mechanism (8) in the radial direction (R). Hence, movement of oil from the gear included in the reduction device (3) to the inner opening part (81a) is hindered by the cylindrical protruding part (192e). That is, the amount of oil scattered from the gear included in the reduction device (3) to the breather mechanism (8) can be reduced to a small level. In general, a gear included in the reduction device (3) rotates at a relatively high speed, and thus, oil is likely to be scattered from the gear. Therefore, by this configuration, it is possible to make it more difficult for oil to flow into the breather mechanism (8).

As an example, in a configuration in which, as described above, the axial extending part (192b) includes the cylindrical protruding part (192e) and the supporting member (109) includes the first supporter (191) and the second supporter (192), it is preferred that the second supporter (192) include the cylindrical protruding part (192e), the cylindrical protruding part (192e) protrude on the first supporter (191) side, and the first planetary gear mechanism (31) be disposed on the radial inner side (R2) with respect to the cylindrical protruding part (192e).

According to this configuration, the cylindrical protruding part (192e) is disposed between the first planetary gear mechanism (31) and the inner opening part (81a) of the breather mechanism (8) in the radial direction (R). Hence, movement of oil from the first planetary gear mechanism (31) to the inner opening part (81a) is hindered by the cylindrical protruding part (192e). That is, the amount of oil scattered from the first planetary gear mechanism (31) to the breather mechanism (8) can be reduced to a small level. Therefore, it is possible to make it more difficult for oil to flow into the breather mechanism (8).

In addition, it is preferred that the supporting member (9, 109, 209, 309) be formed so as to support a rotating member disposed inside the case (1).

According to this configuration, since there is no need to separately provide a member that supports a rotating member, an increase in the size and cost of the device can be suppressed.

Here, it is preferred that the rotating electrical machine (2) include a rotor shaft (27), and the first supporter (91, 191, 291, 391) rotatably support the rotor shaft (27) which is the rotating member.

According to this configuration, since there is no need to separately provide a member that supports the rotor shaft (27), an increase in the size and cost of the device can be suppressed.

In addition, it is preferred that the first supporter (91, 191, 291, 391) rotatably support the first sun gear (S31) which is the rotating member.

According to this configuration, since there is no need to separately provide a member that supports the first sun gear (S31), an increase in the size and cost of the device can be suppressed.

In addition, it is preferred that the second supporter (92, 192, 292, 392) rotatably support the second carrier (C32) which is the rotating member.

According to this configuration, the second ring gear (R32) and the second carrier (C32) which are two elements of the second planetary gear mechanism (32) are supported by the second supporter (92, 192, 292, 392). Thus, the second planetary gear mechanism (32) can be accurately supported.

In addition, it is preferred that the differential gear device (4) include a hollow differential case (D4), the differential case (D4) be integrated with the carrier (C31, C32), and the supporting member (9, 109, 209, 309) rotatably support the carrier (C31, C32) and the differential case (D4) through a bearing (66) supported by the supporting member (9, 109, 209, 309).

According to this configuration, the carrier (C31, C32) and the differential case (D4) can be rotatably supported by a simple configuration, using the supporting member (9, 109, 209, 309).

INDUSTRIAL APPLICABILITY

A technique according to the present disclosure can be used in a vehicle drive device including a rotating electrical machine serving as a drive power source for two wheels; a differential gear device that distributes drive power from the rotating electrical machine to the two wheels; and a reduction device.

The invention claimed is:

1. A vehicle drive device comprising:
   a rotating electrical machine that serves as a drive power source for a first wheel and a second wheel;
   a differential gear device that distributes drive power from the rotating electrical machine to the first wheel and the second wheel;
   a reduction device that includes a planetary gear mechanism with a sun gear, a carrier, and a ring gear; and
   a case that accommodates the rotating electrical machine, the differential gear device, and the reduction device, wherein:
   the differential gear device and the reduction device are disposed coaxially with the rotating electrical machine,
   the reduction device is disposed between the rotating electrical machine and the differential gear device in an axial direction,
   a support disposed inside the case is supported by the case,
   the ring gear is unrotatably supported by the support,
   the case and the support are in plane contact with each other, and
   a contact surface between the case and the support lies in a direction orthogonal to the axial direction.

2. The vehicle drive device according to claim 1, wherein the support includes a protruding wall that protrudes more on a radial inner side than a second support and that is continuously formed in a circumferential direction, the second support unrotatably supporting the ring gear.

3. The vehicle drive device according to claim 1, wherein the case and the support are coupled to each other with a bolt.

4. The vehicle drive device according to claim 1, wherein the case includes a cylindrical surrounding wall that encloses radial outer sides of the rotating electrical machine, the differential gear device, and the reduction device.

5. The vehicle drive device according to claim 1, wherein
   the reduction device further includes a second planetary gear mechanism including a second sun gear, a second carrier, and a second ring gear, in addition to a first planetary gear mechanism including a first sun gear, a first carrier, and a first ring gear, the first planetary gear mechanism being the planetary gear mechanism, the first sun gear being the sun gear, the first carrier being the carrier, and the first ring gear being the ring gear,
   the first planetary gear mechanism is disposed more on a rotating electrical machine side in the axial direction than the second planetary gear mechanism, and
   the support supports both the first ring gear and the second ring gear.

6. The vehicle drive device according to claim 5, wherein the support includes a first supporter and a second supporter,
   the first ring gear is supported by the first supporter, and the second ring gear is supported by the second supporter.

7. The vehicle drive device according to claim 6, wherein one of the first supporter and the second supporter is supported by the case, and
   another one of the first supporter and the second supporter is coupled to one of the first supporter and the second supporter.

8. The vehicle drive device according to claim 6, wherein the first supporter and the second supporter are supported at different locations on the case.

9. The vehicle drive device according to claim 6, further comprising a breather that communicates between an inner opening part and outside of the case, the inner opening opening inside the case, wherein:
   the support includes an axial extension extending in the axial direction, and
   the breather is disposed at a location where the breather overlaps the axial extension as viewed in a radial direction.

10. The vehicle drive device according to claim 9, wherein
    the axial extension includes a cylindrical protrusion at a portion of the axial extension on one side of the axial direction with respect to the inner opening, the cylindrical protrusion protruding on the one side and being continuously formed in a circumferential direction, and
    at least one of gears included in the reduction device is disposed on the radial inner side with respect to the cylindrical protrusion.

11. The vehicle drive device according to claim 10, wherein
    the second supporter includes the cylindrical protrusion,
    the cylindrical protrusion protrudes on the first supporter side, and
    the first planetary gear mechanism is disposed on the radial inner side with respect to the cylindrical protrusion.

12. The vehicle drive device according to claim 6, wherein the support is formed so as to support a rotating member disposed inside the case.

13. The vehicle drive device according to claim 12, wherein
the rotating electrical machine includes a rotor shaft, and
the first supporter rotatably supports the rotor shaft, the rotor shaft being the rotating member.

14. The vehicle drive device according to claim 12, wherein the first supporter rotatably supports the first sun gear, the first sun gear being the rotating member.

15. The vehicle drive device according to claim 12, wherein the second supporter rotatably supports the second carrier, the second carrier being the rotating member.

16. The vehicle drive device according to claim 5, wherein
the support includes a first supporter and a second supporter,
each of the first supporter and the second supporter is supported by the case, and
both the first ring gear and the second ring gear are supported by the second supporter.

17. The vehicle drive device according to claim 1, further comprising a breather that communicates between an inner opening and outside of the case, the inner opening opening inside the case, wherein:

the support includes an axial extension extending in the axial direction, and
the breather is disposed at a location where the breather overlaps the axial extension as viewed in a radial direction.

18. The vehicle drive device according to claim 17, wherein
the axial extension includes a cylindrical protrusion at a portion of the axial extension on one side of the axial direction with respect to the inner opening, the cylindrical protrusion protruding on the one side and being continuously formed in a circumferential direction, and
at least one of gears included in the reduction device is disposed on the radial inner side with respect to the cylindrical protrusion.

19. The vehicle drive device according to claim 1, wherein the support is formed so as to support a rotating member disposed inside the case.

20. The vehicle drive device according claim 1, wherein
the differential gear device includes a hollow differential case,
the differential case is integrated with the carrier, and
the support rotatably supports the carrier and the differential case through a bearing supported by the support.

* * * * *